US012251882B2

(12) United States Patent
Elgali et al.

(10) Patent No.: US 12,251,882 B2
(45) Date of Patent: Mar. 18, 2025

(54) METHOD OF PRINTING A THREE-DIMENSIONAL OBJECT COMPRISING A PLURALITY OF DISCRETE ELEMENTS

(71) Applicant: STRATASYS LTD., Rehovot (IL)

(72) Inventors: Lior Elgali, Tel-Aviv (IL); Naftali Emanuel Eder, Kiryat Gat (IL)

(73) Assignee: STRATASYS LTD., Rehovot (IL)

( * ) Notice: Subject to any disclaimer, the term of this patent is extended or adjusted under 35 U.S.C. 154(b) by 421 days.

(21) Appl. No.: 17/789,872

(22) PCT Filed: Dec. 30, 2020

(86) PCT No.: PCT/IL2020/051358
§ 371 (c)(1),
(2) Date: Jun. 29, 2022

(87) PCT Pub. No.: WO2021/137232
PCT Pub. Date: Jul. 8, 2021

(65) Prior Publication Data
US 2023/0052977 A1  Feb. 16, 2023

Related U.S. Application Data

(60) Provisional application No. 62/956,257, filed on Jan. 1, 2020.

(51) Int. Cl.
*B33Y 10/00* (2015.01)
*B29C 64/171* (2017.01)
(Continued)

(52) U.S. Cl.
CPC .......... *B29C 64/393* (2017.08); *B29C 64/171* (2017.08); *B33Y 10/00* (2014.12); *B33Y 50/02* (2014.12)

(58) Field of Classification Search
CPC ......... B33Y 50/02; B33Y 10/00; B33Y 30/00; G05B 2219/49007; G05B 2219/49023
See application file for complete search history.

(56) References Cited

U.S. PATENT DOCUMENTS 10,388,064 B2   8/2019  Harayama et al.
11,951,566 B2 * 4/2024  Vasil ..................... B29C 64/393
(Continued)

FOREIGN PATENT DOCUMENTS

WO   WO 2019/008355   1/2019
WO   WO 2019/089005   5/2019

OTHER PUBLICATIONS

International Search Report dated Mar. 25, 2021 for corresponding PCT Application No. PCT/IL2020/051358.

*Primary Examiner* — Darrin D Dunn
(74) *Attorney, Agent, or Firm* — PEARL COHEN ZEDEK LATZER BARATZ LLP

(57) ABSTRACT

A method of printing a 3D object comprising a plurality of discrete elements, the method comprising: receiving a 3D digital model of a shell group comprising one or more shells representing the plurality of discrete elements; defining, in the 3D digital model, a unifying shell to at least partly envelop one or more shells of the shell group to provide a unified digital model comprising the shell group and the unifying shell; assigning the unifying shell with at least one transparent building material that is transparent upon dispensing and solidifying thereof; assigning the one or more shells of the shell group with one or more building materials; and dispensing, in layers, the at least one transparent building material and the one or more building materials according to the unified digital model to form a 3D object comprising one or more discrete elements that are at least partly connected by a unifying element.

16 Claims, 16 Drawing Sheets

(51) Int. Cl.
*B29C 64/393* (2017.01)
*B33Y 50/02* (2015.01)

(56) References Cited

U.S. PATENT DOCUMENTS

| | | | | |
|---|---|---|---|---|
| 2013/0241114 | A1* | 9/2013 | Ravich | B29C 64/112 |
| | | | | 425/150 |
| 2015/0079327 | A1* | 3/2015 | Kautz | B33Y 50/02 |
| | | | | 428/80 |
| 2015/0251357 | A1* | 9/2015 | Jin | B29C 64/106 |
| | | | | 700/119 |
| 2016/0167297 | A1* | 6/2016 | Donaldson | B29C 64/112 |
| | | | | 264/129 |
| 2016/0366728 | A1* | 12/2016 | Folgar | H05B 6/64 |
| 2017/0341304 | A1* | 11/2017 | Miller | B33Y 50/02 |
| 2018/0194076 | A1* | 7/2018 | Bell | B29C 64/393 |
| 2018/0276316 | A1* | 9/2018 | Brochu | G06T 17/00 |
| 2018/0373227 | A1* | 12/2018 | Sadusk | H04N 1/00676 |
| 2019/0210272 | A1* | 7/2019 | Ochi | B29C 64/112 |
| 2021/0008922 | A1* | 1/2021 | Meersseman | B33Y 50/02 |

\* cited by examiner

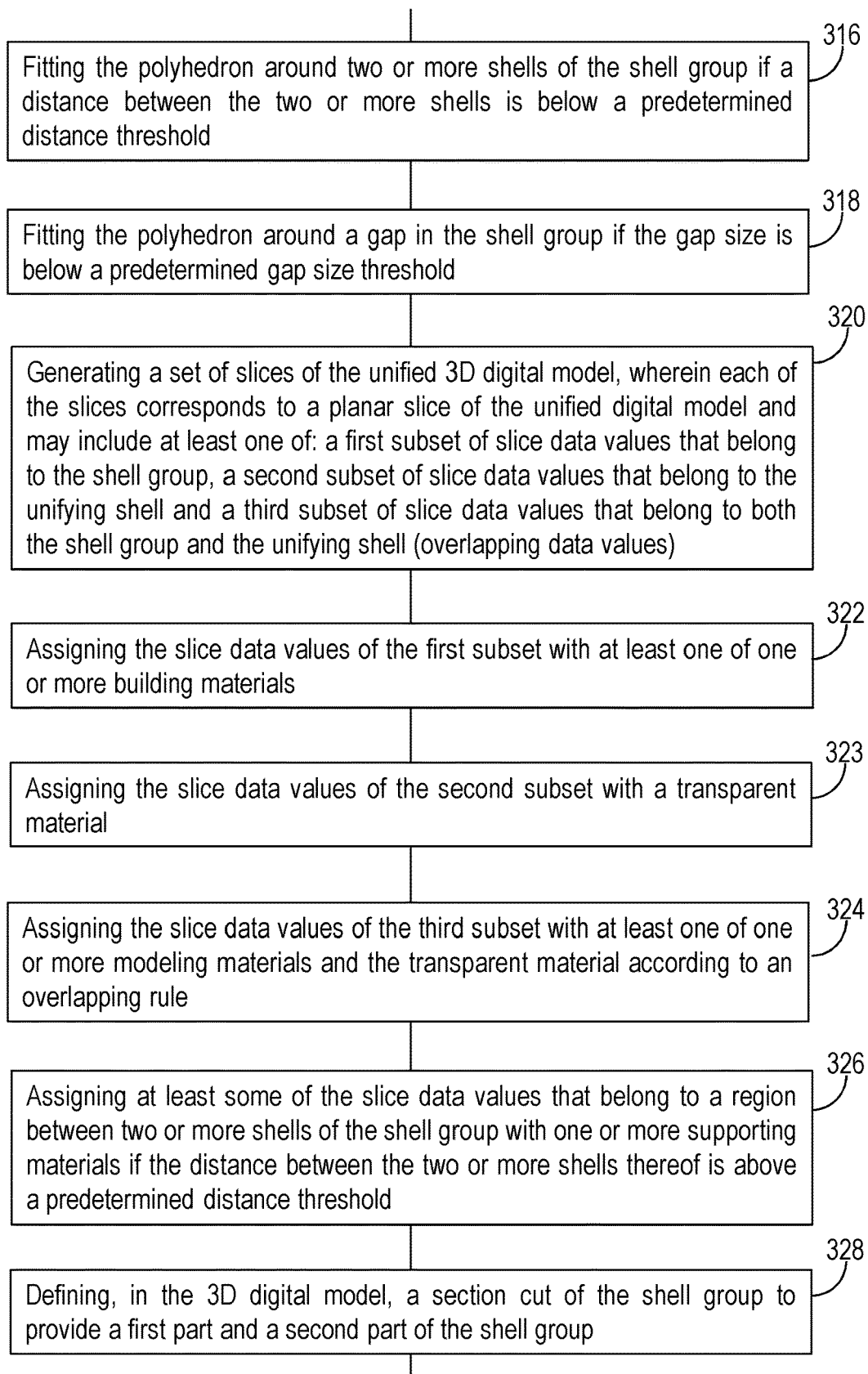
FIG. 4 (cont. 1)

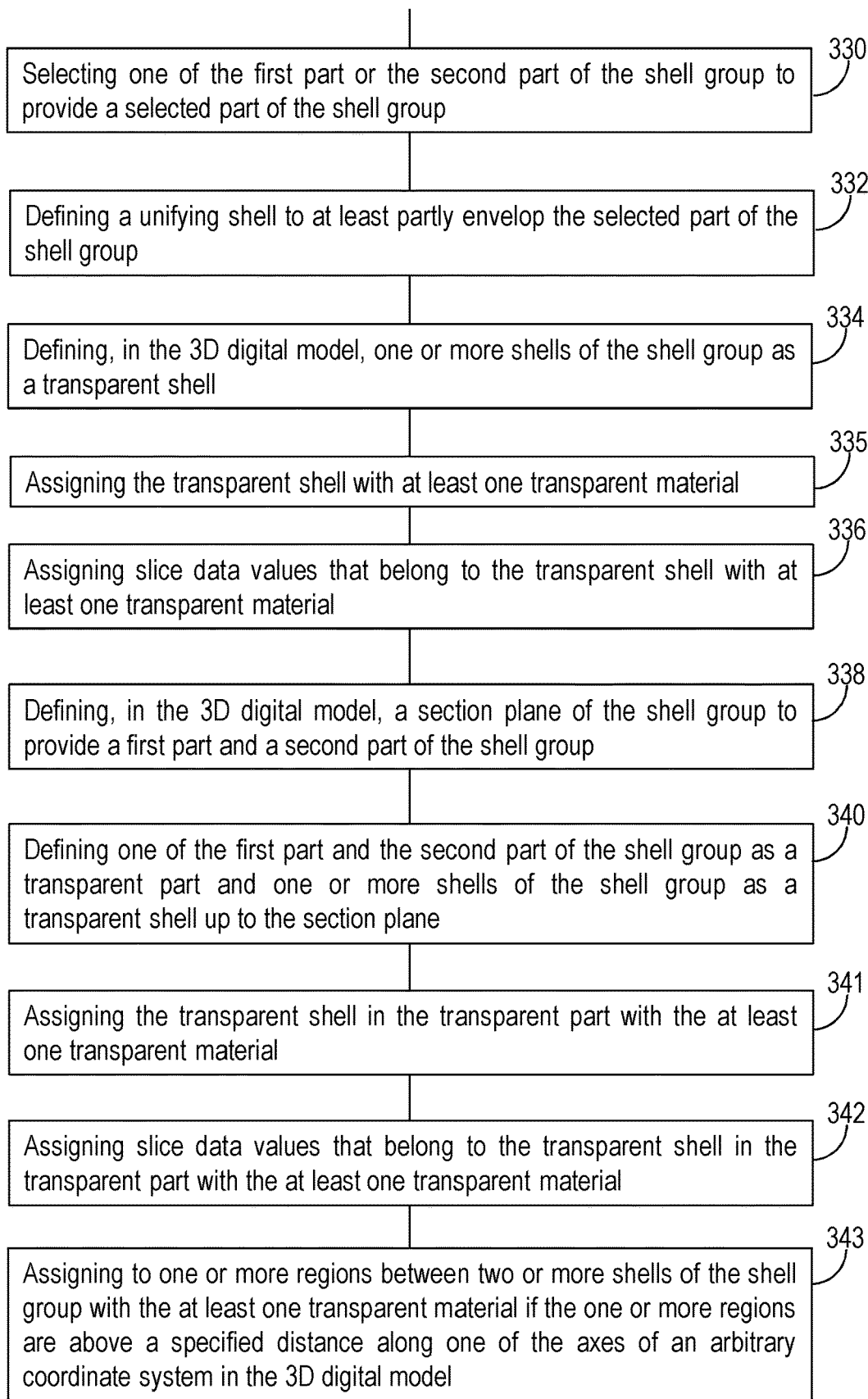
FIG. 4 (cont. 2)

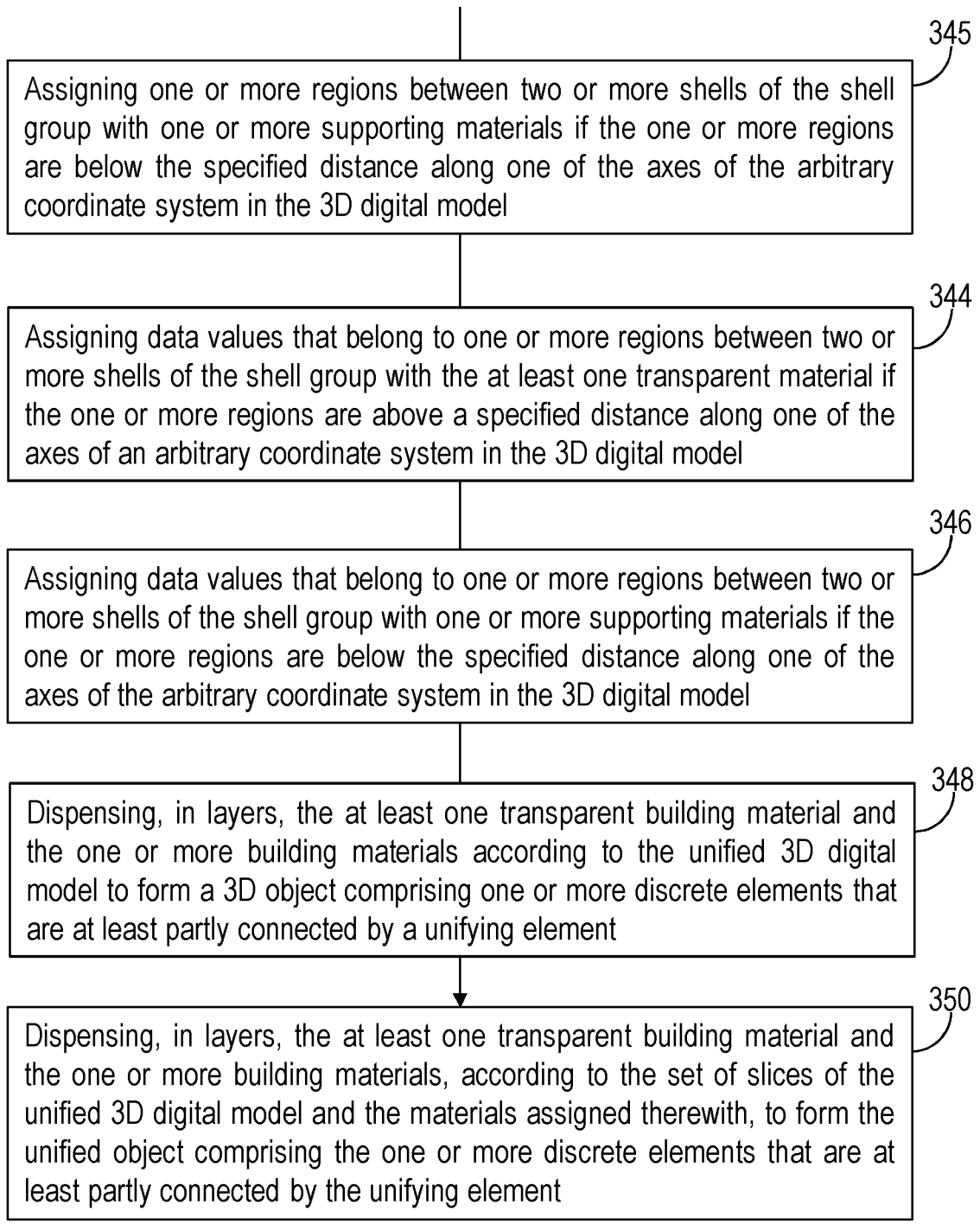
FIG. 4 (cont. 3)

METHOD OF PRINTING A THREE-DIMENSIONAL OBJECT COMPRISING A PLURALITY OF DISCRETE ELEMENTS

CROSS-REFERENCE TO RELATED APPLICATIONS

This application is a National Phase Application of PCT International Application No. PCT/IL2020/051358, International Filing Date Dec. 30, 2020, claiming the benefit of U.S. Provisional Patent Application No. 62/956,257, filed Jan. 1, 2020, all of which are hereby incorporated by reference.

FIELD OF THE INVENTION

The present invention relates to the field of additive manufacturing (AM), and more particularly, to three-dimensional (3D) printing of an object comprising a plurality of discrete elements with an inkjet AM system.

BACKGROUND OF THE INVENTION

In three-dimensional (3D) inkjet printing, building materials are selectively jetted from one or more print heads and dispensed onto a fabrication tray to form the 3D object, layer-by-layer, according to a pre-determined configuration as defined by a software file. Building materials can be modeling materials, which are selectively dispensed to produce the 3D object, and support materials (also referred to as "supporting material"), which are selectively dispensed to form support constructions which sustain specific regions of the 3D object during the printing process. For instance, a support construction may be necessary when the object comprises negative angle surfaces, hollows and/or overhangs, and is typically configured to be removed after the printing is complete.

FIG. 1 depicts a typical process 90 of printing a group of 3D objects 52 using a 3D inkjet printing system 80. At stage 92, a three-dimensional digital model 70 including a group of 3D object models 72 is generated or received by a pre-processing computational device 60. An object model may comprise a single part or element 72a (also referred to as "shell" or "geometry") or several parts or elements that forms an assembly of parts 72b (also referred to as "assembly"). At this stage, a user may manipulate, update or modify three-dimensional digital model 70 and/or transfer digital model 70 to system 80 for printing. Alternatively, computational device 60 may automatically or according to a predefined schedule, transfer digital model 70 to system 80 for printing. At stage 94, a group of printed objects 52 is manufactured on system 80 in accordance with the data of digital model 70 encoding object models 72. At least some of printed objects 52a and printed assembly 52b, or portions thereof, may be supported or separated by one or more support structures 40. At stage 96, support structures 40 are removed by mechanical means, chemical means or any other suitable techniques of support removal. Removal of support structures 40 from the group of printed objects 52 causes printed objects 52a and assembly 52b to disconnect and/or disassemble, thereby losing their original spatial relative positioning with respect to each other. However, in some cases, there is a need to retain a group of printed objects 52a and/or printed assembly 52b in their initial positioning with respect to each other after the printing process is complete.

SUMMARY OF THE INVENTION

Some embodiments of the present invention may provide a method of printing a 3D object including a plurality of discrete elements. The method may comprise: receiving a 3D digital model of a shell group including one or more shells representing the plurality of discrete elements; defining, in the 3D digital model, a unifying shell to at least partly envelop one or more shells of the shell group so as to provide a unified 3D digital model including the shell group and the unifying shell; assigning the unifying shell of the unified 3D digital model with at least one transparent building material, wherein the at least one transparent building material is transparent upon dispensing and solidifying thereof; assigning the one or more shells of the shell group of the unified 3D digital model with one or more building materials; and dispensing, in layers, the at least one transparent building material and the one or more building materials according to the unified 3D digital model to form a 3D object including one or more discrete elements that are at least partly connected by a unifying element.

Some embodiments may further include defining the unifying shell by at least partly enveloping one or more shells of the shell group by a bounding box.

Some embodiments may further include including offsetting at least one of one or more edges, one or more vertices, and/or one or more faces of the bounding box, inwardly or outwardly, in the same manner or independently of one another.

Some embodiments may further include defining the unifying shell by fitting a polyhedron around one or more shells of the shell group.

Some embodiments may further include offsetting at least one of one or more edges, one or more vertices, and/or one or more faces of the polyhedron, inwardly or outwardly, in the same manner or independently of one another.

Some embodiments may further include fitting the polyhedron around two or more shells of the shell group if a distance between the two or more shells is below a predetermined distance threshold.

Some embodiments may further include fitting the polyhedron around a gap in the shell group if the gap size is below a predetermined gap size threshold.

Some embodiments may further include: defining, in the 3D digital model, one or more shells of the shell group as a transparent shell; and assigning the transparent shell with the at least one transparent building material.

Some embodiments may further include: defining, in the 3D digital model, a section cut of the shell group to provide a first part and a second part of the shell group; selecting one of the first part or the second part of the shell group to provide a selected part of the shell group; and defining the unifying shell to at least partly envelop the selected part of the shell group.

Some embodiments may further include: defining, in the 3D digital model, a section plane of the shell group to provide a first part and a second part of the shell group; defining one of the first part and the second part of the shell group as a transparent part and one or more shells of the shell group as a transparent shell up to the section plane; and assigning the transparent shell in the transparent part with the at least one transparent building material.

Some embodiments may further include assigning one or more regions between two or more shells of the shell group with the at least one transparent building material if the one or more regions are above a specified distance along one of the axes of an arbitrary coordinate system in the 3D digital model.

Some embodiments may further include assigning one or more regions between two or more shells of the shell group with one or more supporting materials if the one or more regions are below the specified distance along one of the axes of the arbitrary coordinate system in the 3D digital model.

Some embodiments may further include: generating a set of slices of the unified 3D digital model, wherein each of the slices corresponds to a planar slice of the unified 3D digital model and includes at least one of: a first subset of slice data values that belong to the shell group, a second subset of slice data values that belong to the unifying shell, and a third subset of slice data values that belong to both the shell group and the unifying shell; assigning the slice data values of the first subset with at least one of the one or more building materials; assigning the slice data values of the second subset with the at least one transparent building material; assigning the slice data values of the third subset with at least one of the one or more building materials and the at least one transparent building material according to an overlapping rule; and dispensing, in layers, the at least one transparent building material and the one or more building materials, according to the set of slices of the unified 3D digital model and the materials assigned therewith to form the 3D object including the one or more discrete elements that are at least partly connected by the unifying element.

In some embodiments, the overlapping rule is a priority rule which determines a priority order between the data values of the shell group and the data values of the unifying shell.

Some embodiments may further include assigning at least some of the slice data values that belong to a region between two or more shells of the shell group with one or more supporting materials if the distance between the two or more shells thereof is above a predetermined distance threshold.

Some embodiments of the present invention may provide a system for printing a 3D object including a plurality of discrete elements. The system may comprise: a processing unit configured to: receive a 3D digital model of a shell group including one or more shells representing the plurality of discrete elements; define, in the 3D digital model, a unifying shell to at least partly envelop one or more shells of the shell group so as to provide a unified 3D digital model including the shell group and the unifying shell; assign the unifying shell of the unified 3D digital model with at least one transparent building material, wherein the at least one transparent building material is transparent upon dispensing and solidifying thereof; and assign the one or more shells of the shell group of the unified 3D digital model with one or more building materials; and a 3D printing device configured to dispense, in layers, the at least one transparent building material and the one or more building materials according the unified 3D digital model to form a 3D object including one or more discrete elements that are at least partly enveloped by a unifying element.

In some embodiments, the processing unit is further configured to define the unifying shell by at least partly enveloping one or more shells of the shell group by a bounding box.

In some embodiments, the processing unit is further configured to offset at least one of one or more edges, one or more vertices, and/or one or more faces of the bounding box, inwardly or outwardly, in the same manner or independently of one another.

In some embodiments, the processing unit is further configured to define the unifying shell by fitting a polyhedron around one or more shells of the shell group.

In some embodiments, the processing unit is further configured to offset at least one of one or more edges, one or more vertices, and/or one or more faces of the polyhedron, inwardly or outwardly, in the same manner or independently of one another.

In some embodiments, the processing unit is further configured to fit the polyhedron around two or more shells of the shell group if a distance between the two or more shells is below a predetermined distance threshold.

In some embodiments, the processing unit is further configured to fit the polyhedron around a gap in the shell group if the gap size is below a predetermined gap size threshold.

In some embodiments, the processing unit is further configured to: define, in the 3D digital model, one or more shells of the shell group as a transparent shell; and assign the transparent shell with at least one of the at least one transparent building material.

In some embodiments, the processing unit is further configured to: define, in the 3D digital model, a section cut of the shell group to provide a first part and a second part of the shell group; select one of the first part or the second part of the shell group to provide a selected part of the shell group; and define the unifying shell to at least partly envelop the selected part of the shell group.

In some embodiments, the processing unit is further configured to: define, in the 3D digital model, a section plane of the shell group to provide a first part and a second part of the shell group; define, in the 3D digital model, one of the first part and the second part of the shell group as a transparent part and one or more shells of the shell group as a transparent shell up to the section plane; and assign the transparent shell in the transparent part with the at least one transparent building material.

In some embodiments, the processing unit is further configured to assign one or more regions between two or more shells of the shell group with the at least one transparent building material if the one or more regions are above a specified distance along one of the axes of an arbitrary coordinate system in the 3D digital model.

In some embodiments, the processing unit is further configured to assign one or more regions between two or more shells of the shell group with one or more supporting materials if the one or more regions are below the specified distance along one of the axes of the arbitrary coordinate system in the 3D digital model.

In some embodiments, the processing unit is further configured to: generate a set of slices of the unified 3D digital model, wherein each of the slices corresponds to a planar slice of the unified 3D digital model and includes at least one of: a first subset of slice data values that belong to the shell group, a second subset of slice data values that belong to the unifying shell, and a third subset of slice data values that belong to both the shell group and the unifying shell; assign the slice data values of the first subset with at least one of the one or more building materials; assign the slice data values of the second subset with the at least one transparent building material; assign the slice data values of the third subset with at least one of the one or more building materials and the at least one transparent building material according to an overlapping rule; and wherein the 3D printing device is configured to dispense, in layers, the at least one transparent building material and the one or more building materials, according to the set of slices of the unified 3D digital model.

In some embodiments, the overlapping rule is a priority rule which determines a priority order between the data values of the shell group and the data values of the unifying shell.

In some embodiments, the processing unit is further configured to assign at least some of the slice data values that belong to a region between two or more shells of the shell group with one or more supporting materials if the distance between the two or more shells thereof is above a predetermined distance threshold.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be effected, reference will now be made, purely by way of example, to the accompanying drawings in which like numerals designate corresponding elements or sections throughout.

In the accompanying drawings:

FIG. 3C schematically depicts a single slice of a set of slices of a unified 3D digital model that includes a group of one or more shells and a unifying shell, according to some embodiments of the invention;

Figure 1:
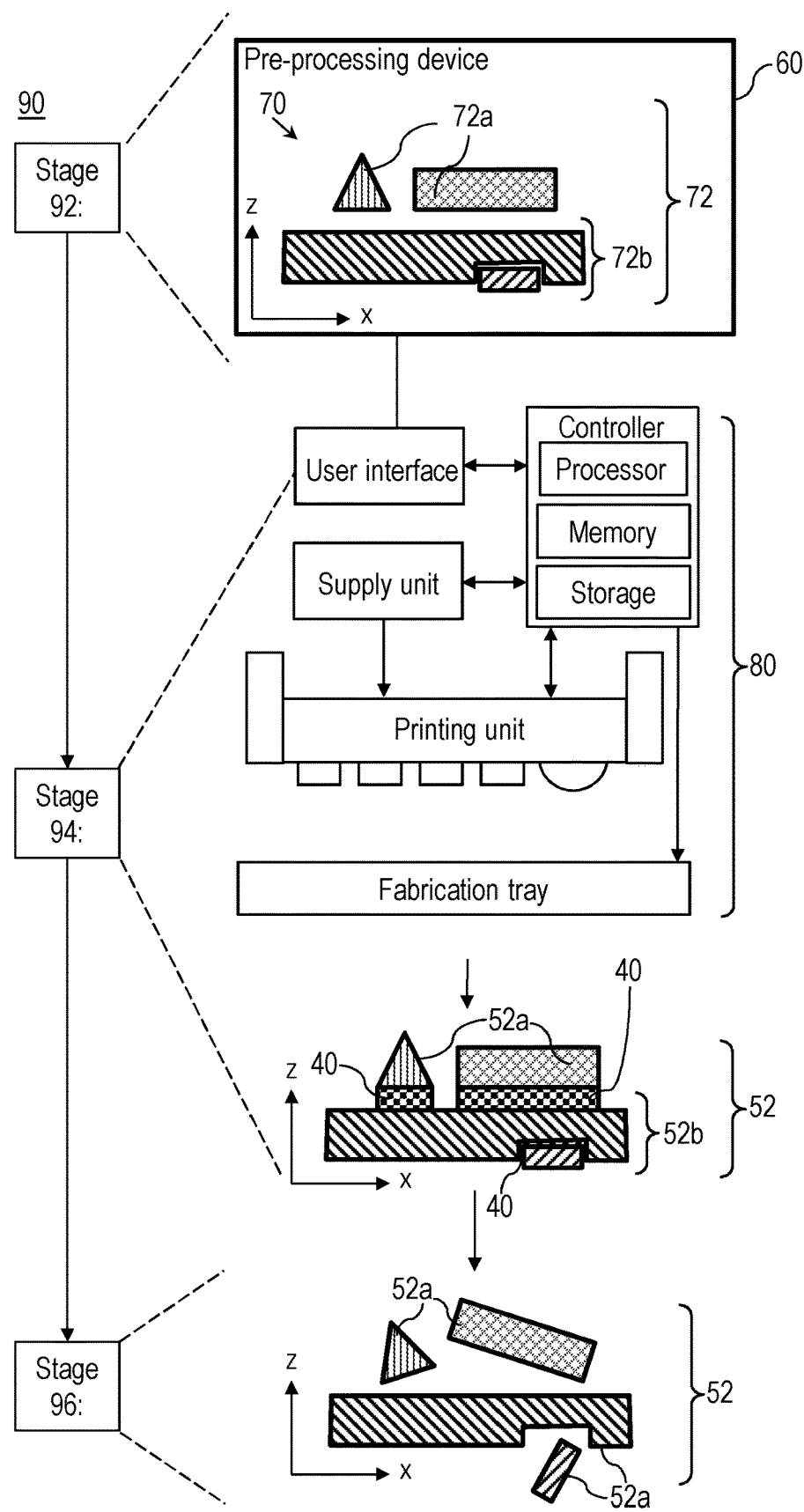
FIG. 1 depicts a typical prior art process of printing a group of 3D objects using an inkjet additive manufacturing (AM) system.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Figure 2:
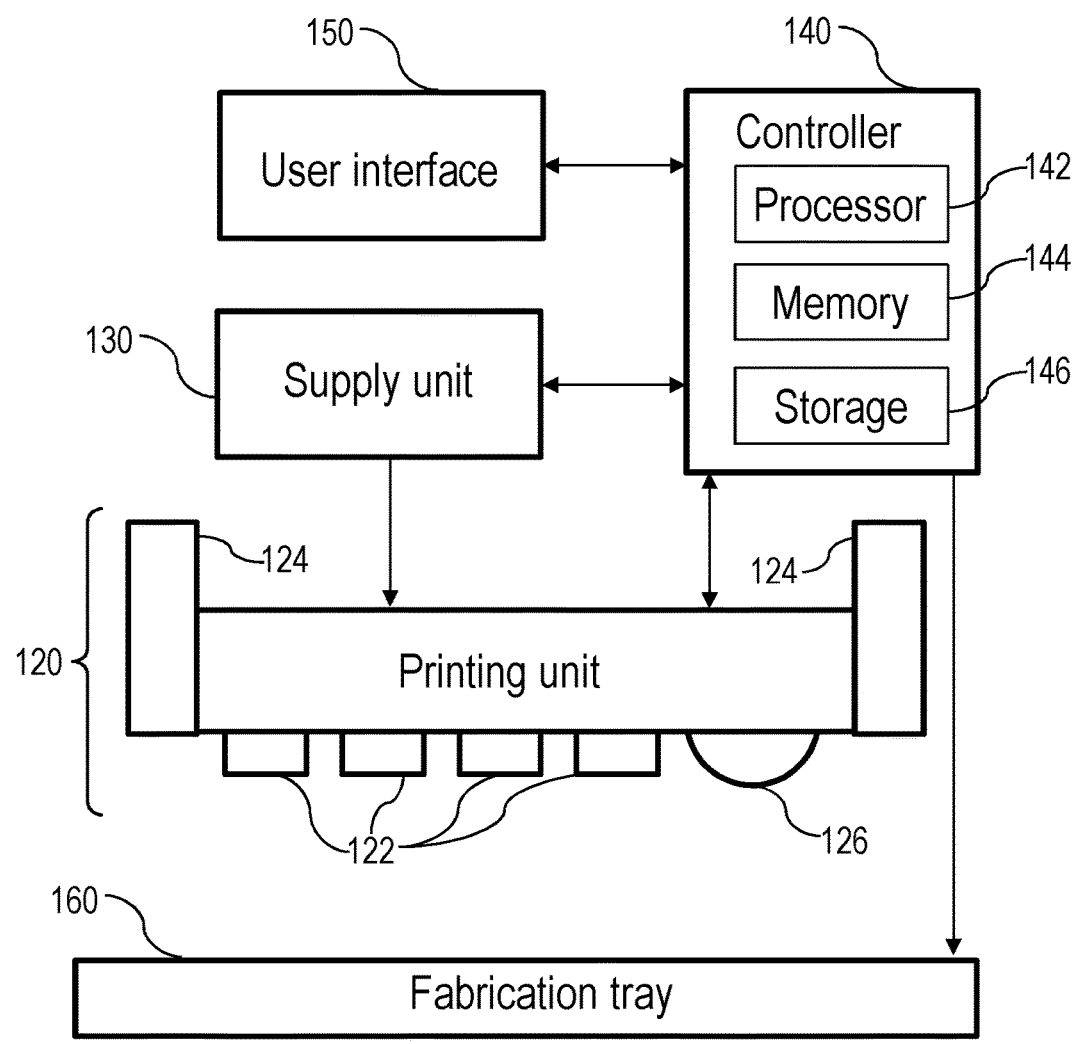
FIG. 2 is a schematic illustration of an inkjet AM system for printing 3D objects, according to some embodiments of the invention.

Reference is now made to FIG. 2, which is a schematic illustration of an inkjet AM system 100 for printing 3D objects, according to some embodiments of the invention. According to some embodiments, AM system 100 may include a printing unit 120 (also referred to as a "printing block"), a supply unit 130, a controller 140, a user interface 150 and a fabrication tray 160. Controller 140 may be configured to control all elements of AM system 100. According to some embodiments, printing unit 120 may include one or more print heads 122, one or more hardening subunits 124, and one or more leveling subunits 126. Print head 122 may be adapted to dispense building materials using any jetting method, e.g., ink jetting, and typically comprises one or more nozzle arrays. Printing unit 120 may move horizontally in X, Y or both X and Y directions and optionally also vertically in the Z direction. Print head/s 122 may be configured to dispense different building materials such that two or more building materials may be dispensed in a single deposition scan (also referred to as "pass" or "travel") over the fabrication tray. Print head/s 122 may be supplied with building materials from supply unit 130. As known in the art, the term "print head" or "3D printing head" refers to a hardware component that is suitable to dispense building materials at predefined positions, i.e., selective deposition of building materials Implementations of commercially available 3D printing heads may include a single channel printing head with one nozzle array (e.g., holding a single type or color of building material at one time) or a multiple channel printing head having several nozzle arrays (e.g., holding one or more types or colors of building materials at one time). In some embodiments, a print head 122 may be configured to dispense more than two building materials (e.g., multiple channel print head). Print head 122 may be selected from thermal print heads and piezoelectric print heads. Hardening subunit 124 may include any device that is adapted to emit light, heat and the like that may cause the dispensed building material to harden or solidify. For example, hardening subunit 124 may include one or more ultraviolet (UV) lamps (e.g., mercury lamp, UV LED assembly) for curing the dispensed building material. Leveling subunit 126 may include any device that is configured to level and/or control the thickness of a newly formed layer of building material by removing excess building material from the layer. For example, leveling subunit 126 may be a roller. Leveling subunit 126 may include a waste collection device (not shown) for collecting the excess building material removed during leveling. Supply unit 130 may include a building material cabinet, one or more building material containers or cartridges, and a distribution system for supplying building materials to print heads 122. Controller 140 may include a processor 142, a memory 144 and a storage 146. Processor 142 may, for example, control the movement of printing unit 120 and/or fabrication tray 160. Memory 144 may, for example, include an executable code. The executable code may include codes or instructions for controlling AM system 100 to print 3D objects according to embodiments of the present invention. Storage 146 may store files that include design parameters of the 3D objects and the corresponding support structures to be printed by AM system 100. User interface 150 may be or may include input devices such as a mouse, a keyboard, a touch screen or pad or any suitable input devices and output devices. User interface 50 may allow a user to upload or update codes and instructions for controlling printing of 3D objects according to some embodiments of the invention and/or to upload and update files comprising the design of the 3D objects (e.g., computer aided design (CAD) files) into storage 146. Fabrication tray 160 may be any tray, building or printing surface that is suitable to bear 3D objects and their corresponding support constructions as they are being printed, e.g., manufactured. Fabrication tray 160 may be attached, connected to or include an X-Y table and may be controlled, e.g., by controller 140, to move in the Z direction and/or optionally in the X-Y plane according to the requirements of the printing process.

Figure 3A:
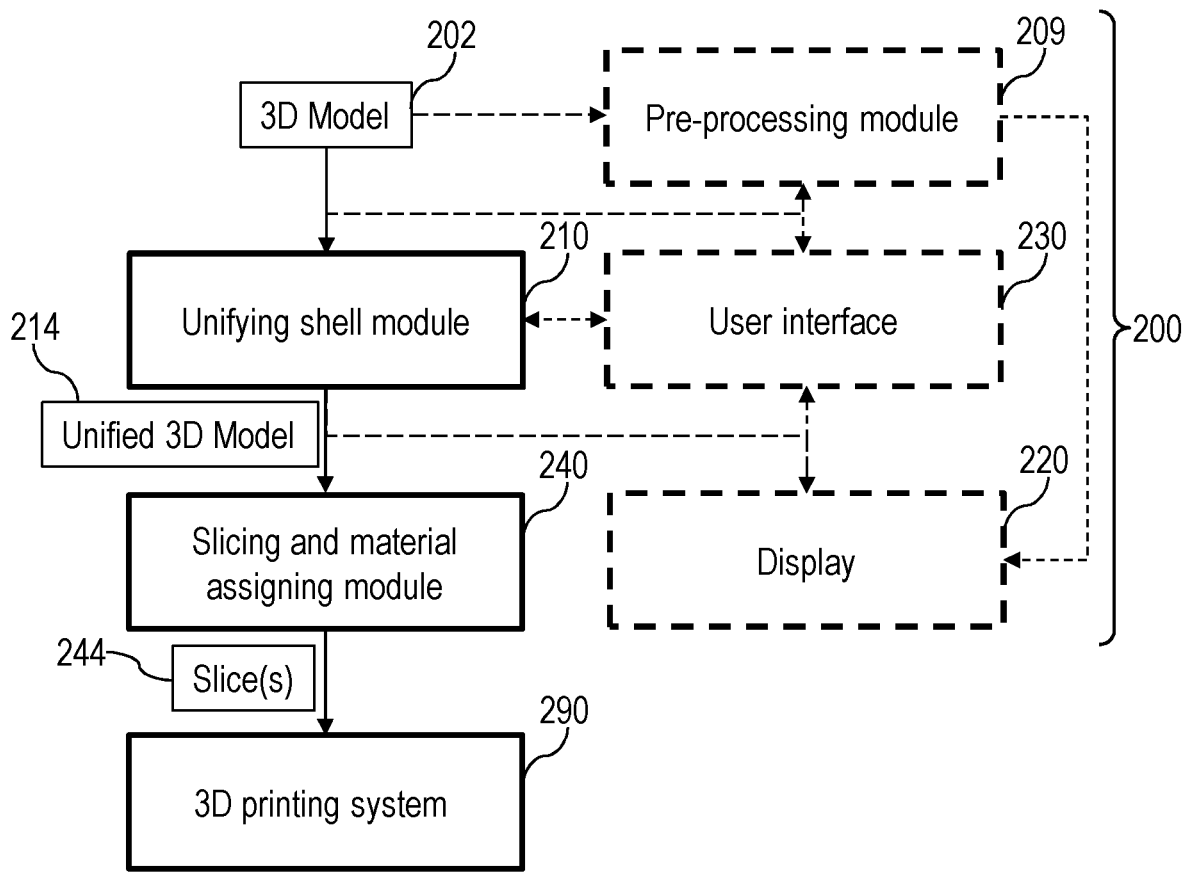
FIG. 3A is a schematic illustration of a system for defining a unifying shell for a group of one or more shells, according to some embodiments of the invention.
Figure 3B:
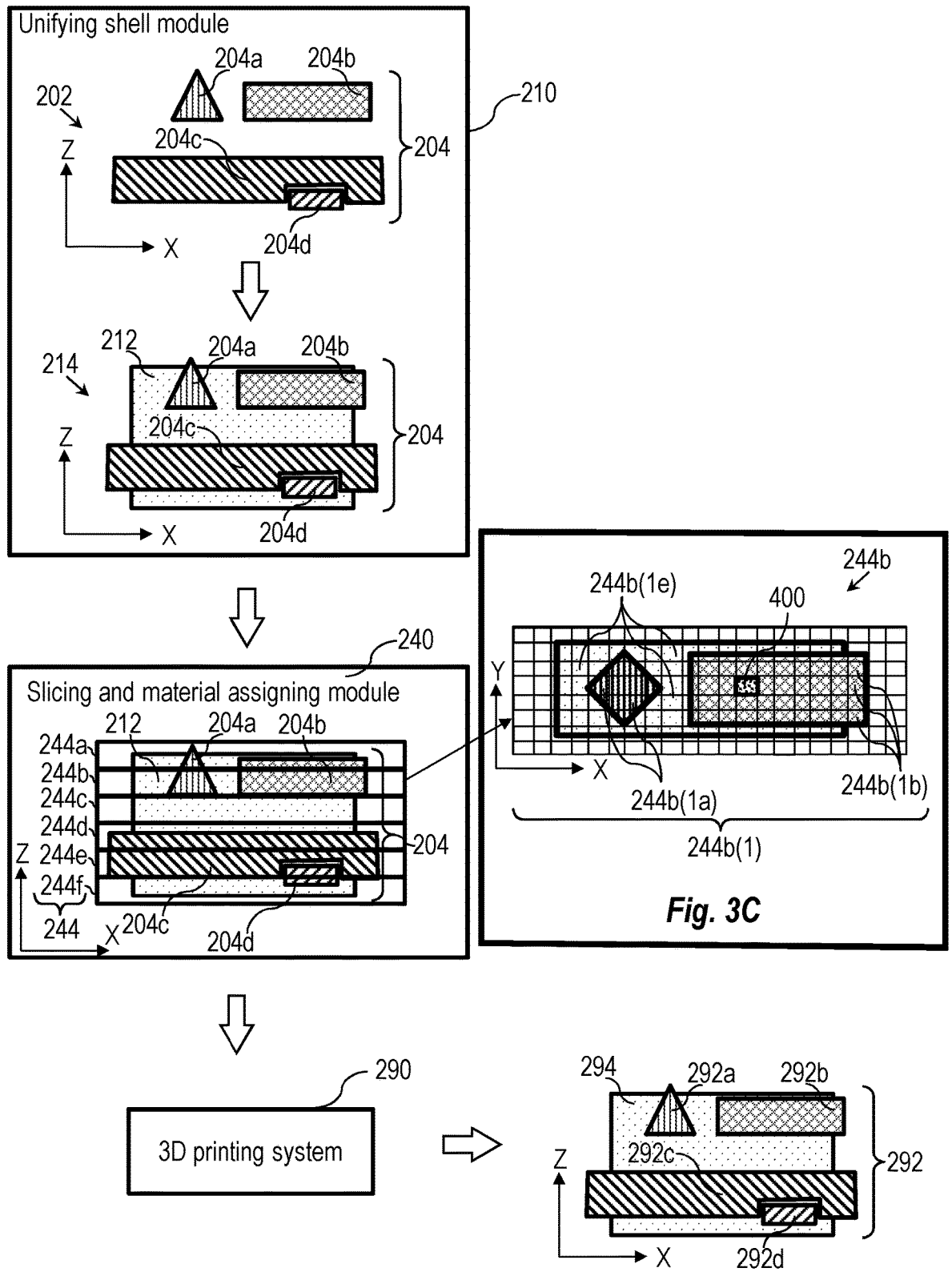
FIG. 3B schematically depicts a process of defining a unifying shell for a group of one or more shells, and printing thereof, according to some embodiments of the invention.

Reference is now made to FIGS. 3A, 3B and 3C. FIG. 3A is a schematic illustration of a system 200 for defining a unifying shell 212 for a shell group 204 of one or more shells, according to some embodiments of the invention. FIG. 3B schematically depicts a process of defining a unifying shell 212 for a shell group 204 of one or more shells, and printing thereof, according to some embodiments of the invention. FIG. 3C schematically depicts a single slice 244b of a set 244 of slices of a unified 3D digital model 214 that includes a shell group 204 and a unifying shell 212, according to some embodiments of the invention. According to some embodiments, system 200 may include a unifying shell module 210 and a slicing and material assigning module 240 (e.g., as shown in FIG. 3A). Optionally, system 200 may include a pre-preprocessing module 209, a display 220 and a user interface 230 (e.g., schematically indicated by dashed lines in FIG. 3A). In some embodiments, unifying shell module 210 may receive a digital model 202 of a shell group 204. Shell group 204 may include one or more parts/shells. For example, FIG. 3B depicts shell group 204 that includes a first shell 204a, a second shell 204b (each of 204a and 204b belonging to a different object, i.e., discrete elements), a third shell 204c and a fourth shell 204d (204c and 204d belonging to the same object/assembly of discrete elements). Digital model 202 may be provided, for example, as an STL format file, but any other suitable file format known in the art may be considered (e.g., VRML, OBJ, 3MF). Unifying shell module 210 may define a unifying shell 212 in digital model 202 to provide a unified 3D digital model 214. Unifying shell 212 may at least partly envelope one or more shells 204a-d of shell group 204. Unified 3D digital model 214 may include shells 204a-d and unifying shell 212. Optionally, digital model 202 may be first inputted into preprocessing module 209, prior to unifying shell module 210 (e.g., as schematically indicated by dashed arrows in FIG. 3A). Preprocessing module 209 may check digital model 202 for potential defects and/or correct the defect thereof. For example, preprocessing module 209 may close holes in any one of shells 204a-d, merge gaps between any one of shells 204a-d, thicken surfaces (e.g., decal, surfaces with no thickness), etc. In some embodiments, preprocessing module 209 may automatically check digital model 202 for potential defects and correct the defects thereof. In some other embodiments, preprocessing module may display digital model 202 on display 220, receive user's input concerning the defects and corrections thereof via user interface 230 and correct the defects according to the user's input. Digital model 202 may be then inputted to unifying shell module 210 for defining unifying shell 212 (e.g., as described above). Optionally, unifying shell module 210 may display unified 3D digital model 214 on display 220. User may, for example, visualize unified 3D digital model 214 and/or modify, change or update unified 3D digital model 214 or at least unifying shell 212 via user interface 230. In some embodiments, slicing and material assigning module 240 may receive unified 3D digital model 214 from unifying shell module 210. Slicing and material assigning module 240 may generate a set 244 of slices of unified 3D digital model 214. Each of slices of set 244 may correspond to a planar slice (e.g., horizontal slice) of unified 3D digital model 214. For example, FIG. 3B depicts set 244 that includes a first slice 244a, a second slice 244b, a third slice 244c, a fourth slice 244d, a fifth slice 244e and a sixth slice 244f of unified 3D digital model 214. Each of slices of set 244 may include a plurality of slice data values. Each of slices of set 244 may include at least one of: a first subset of slice data values that belong to shells 204a-d, a second subset of slice data values that belong to unifying shell 212 and a third subset of slice data values that belong to shells 204a-d and to unifying shell 212. The slice data values of the third subset may belong to one or more regions of unified 3D digital model 214 in which unifying shell 212 at least partly overlaps with one or more shells 204a-d. For example, in the third subset, two different slice data points may represent the same coordinate of unified 3D digital model 214 in an arbitrary coordinate system XYZ—one slice data point that belongs to any one of shells 204a-d and one slice data point that belongs to unifying shell 212. For example, FIG. 3C depicts a planar view (e.g., horizontal view) of second slice 244b of set 244 of slices. Second slice 244b may include a plurality of subsets of slice data values 244b(1), for example: a first subset 244b(1a) that belongs to shell 204a, a second subset 244b(1b) that belongs to shell 204b, and a third subset 244b(1e) that belongs to unifying shell 212. In some embodiments, slicing and material assigning module 240 may assign the slice data values of subsets 244b(1a), 244(1b) and 244(1e) with one or more building materials. For example, slice data values subset 244b(1a) may be assigned with a first building material, slice data values subset 244b(1b) may be assigned with a second building material, and slice data values subset 244b(1e) may be assigned with a third building material. Building material assigned to each subsets 244b(1a), 244b(1b) and 244(1e) may be identical or distinct one from the other. In some embodiments, the building material assigned to a data values subset corresponding to unifying shell (in this case 244b(1e)) is a clear transparent material, while the building material assigned to data values subsets corresponding to object models (and corresponding shells 204(a-d) is different from a clear transparent material. In some cases, there may be two or more data values (also referred to as "overlapping data values") originating from two or more slice data values subsets for the same XY coordinates. For instance, coordinate 400 of slice 244b has a first data value originating from subsets 244b(1b) corresponding to shell 204b, and a second value originating from subsets 244b(1e) corresponding to unifying shell 212. In such cases, slicing and material assigning module 240 may be configured to apply one or more overlapping rules that determine the building material to be assigned in case of overlapping data values. In some embodiments, an overlapping rule may be originally set as a parameter in slicing and material assigning module 240, encoded in the data of digital model 202, or provided by a user via display 220 and user interface 230 if any data conflict arises. In some embodiments, an overlapping rule may be a priority rule which determines a priority order between the different shells data values subsets. For instance, a priority rule may determine that at coordinate 400 the data value of subset 244b(1b) has prioritized over data value of subset 244(1e), and a building material would be assigned according to the data values of subset 244b(1b). Once building materials have been assigned, slice 244b of unified 3D digital model 214 may be printed on 3D printing system 290 using the one or more building materials.

In various embodiments, system 200 may include, or may be in communication with, a 3D printing system 290. 3D printing system 290 may be similar to, for example, AM system 100 described above with respect to FIG. 2. 3D printing system 290 may dispense, in layers, the one or more building materials according to set 244 of slices and the materials assigned therewith, to form a unified object 292. Unified object 292 may include one or more discrete elements (e.g., discrete elements 292a, 292b, 292c, 292d) that are at least partly enveloped/connected by a unifying element 294. One or more discrete elements of unified object 292 and unifying element 294 may be a printed version of shell group 204 and unifying shell 212 of unified 3D digital model 214, respectively.

For example, unified object 292 may include a first printed discrete element 292a, a second printed discrete element 292b, a third printed discrete element 292c and a fourth printed discrete element 292d at least partly enveloped/connected by unifying element 294. First printed discrete element 292a, second printed discrete element 292b, third printed discrete element 292c, fourth printed discrete element 292d and unifying element 294 may be defined by first shell 204a, second shell 204b, third shell 204c, fourth shell 204d and unifying shell 212, respectively, of unified 3D digital model 214. In some embodiments, after printing and hardening or solidifying, unifying element 294 may remain undetached from the different printed discrete elements of unified object 292. Unifying element 294 may prevent disassembling of the printed discrete elements of unified object 292 and may enable maintaining their original spatial relative positioning. In some embodiments, the building material that forms unifying element 294 may be transparent after dispensing and hardening or solidifying thereof. A transparent unifying element 294 may be advantageous, for example, to present the different elements of unified object 292 in their original spatial relative positioning (e.g., exploded view of an industrial design model).

As would be apparent to those of ordinary skill in the art, each module in system 200 may be implemented on its own computing device, a single computing device, or a combination of computing devices. The communication between the modules of system 200 and/or 3D printing system 290 may be wired and/or wireless. Unifying shell module 210 may be capable of defining various unifying shells 212. In some embodiments, the user of system 200 may select unifying shell 212 to be defined via, for example, user interface 230. In some other embodiments, unifying shell module 210 may automatically define unifying shell 212 based on at least one of: geometry, spatial positioning, and any other properties of/assigned to shell group 204, including but not limited to building material, color, transparency, assembly part.

Figure 3D:
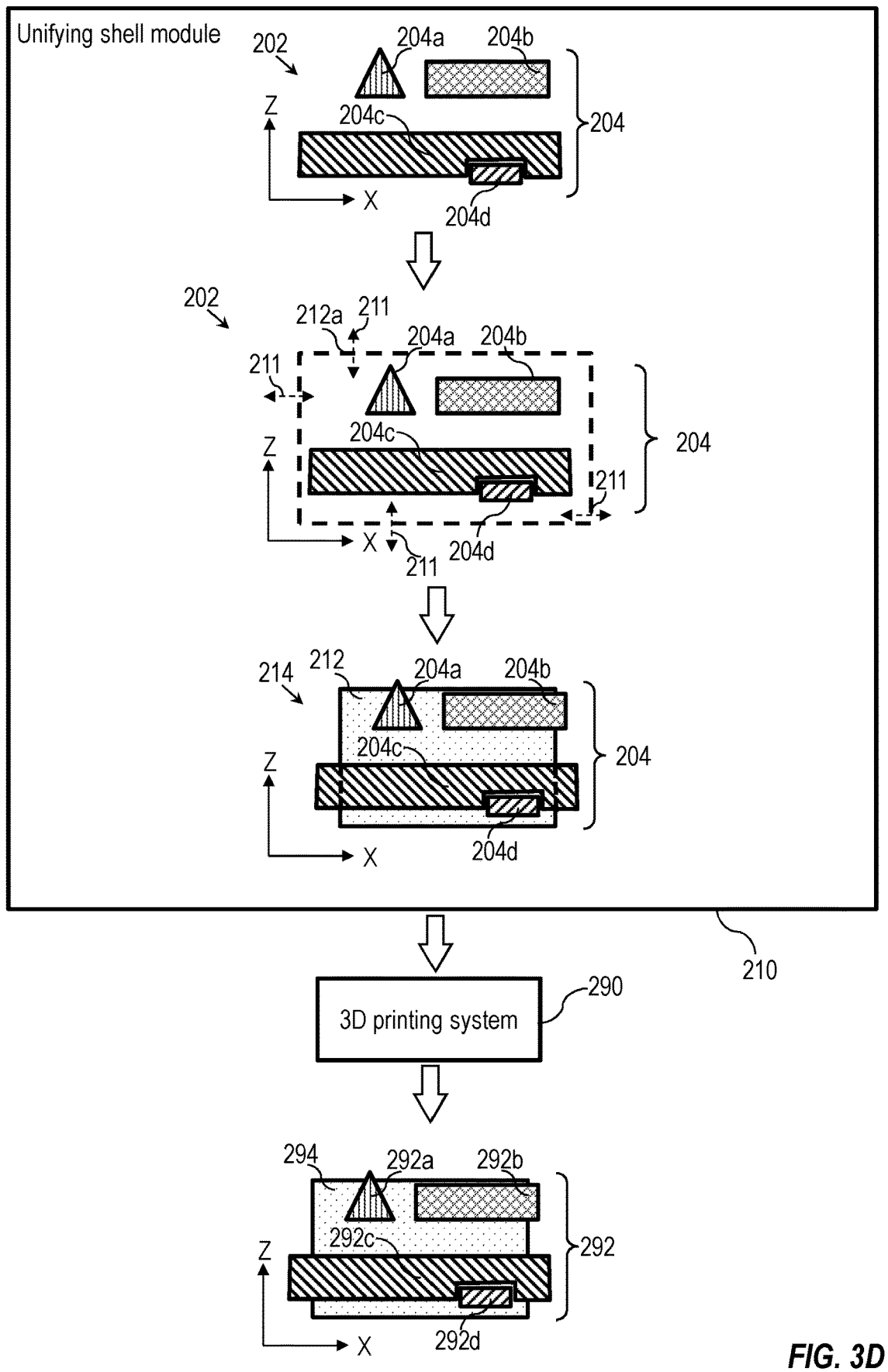
FIG. 3D schematically depicts a process of defining a cube or rectangular prism as an example of a unifying shell for a group of one or more shells, and printing thereof, according to some embodiments of the invention.

Reference is now made to FIG. 3D, which schematically depicts a process of defining a cube or rectangular prism as an example of a unifying shell 212 for a shell group 204 of one or more shells, and printing thereof, according to some embodiments of the invention. In some embodiments, unifying shell module 210 may identify a bounding box 212a surrounding one more shells of shell group 204 and uses it as a basis for generating unifying shell 212. Optionally, unifying shell module 210 may offset one or more edges, vertices, or faces of bounding box 212a, inwardly or outwardly (e.g., as indicated by dashed mows 211 in FIG. 3D). For example, each edge and/or face of bounding box 212a may be offset in the same manner as other edges and/or faces, or independently of one another. In the present case, bounding box 212a is offset inwardly and is used to generate a rectangular prismatic unifying shell 212.

Figure 3E:
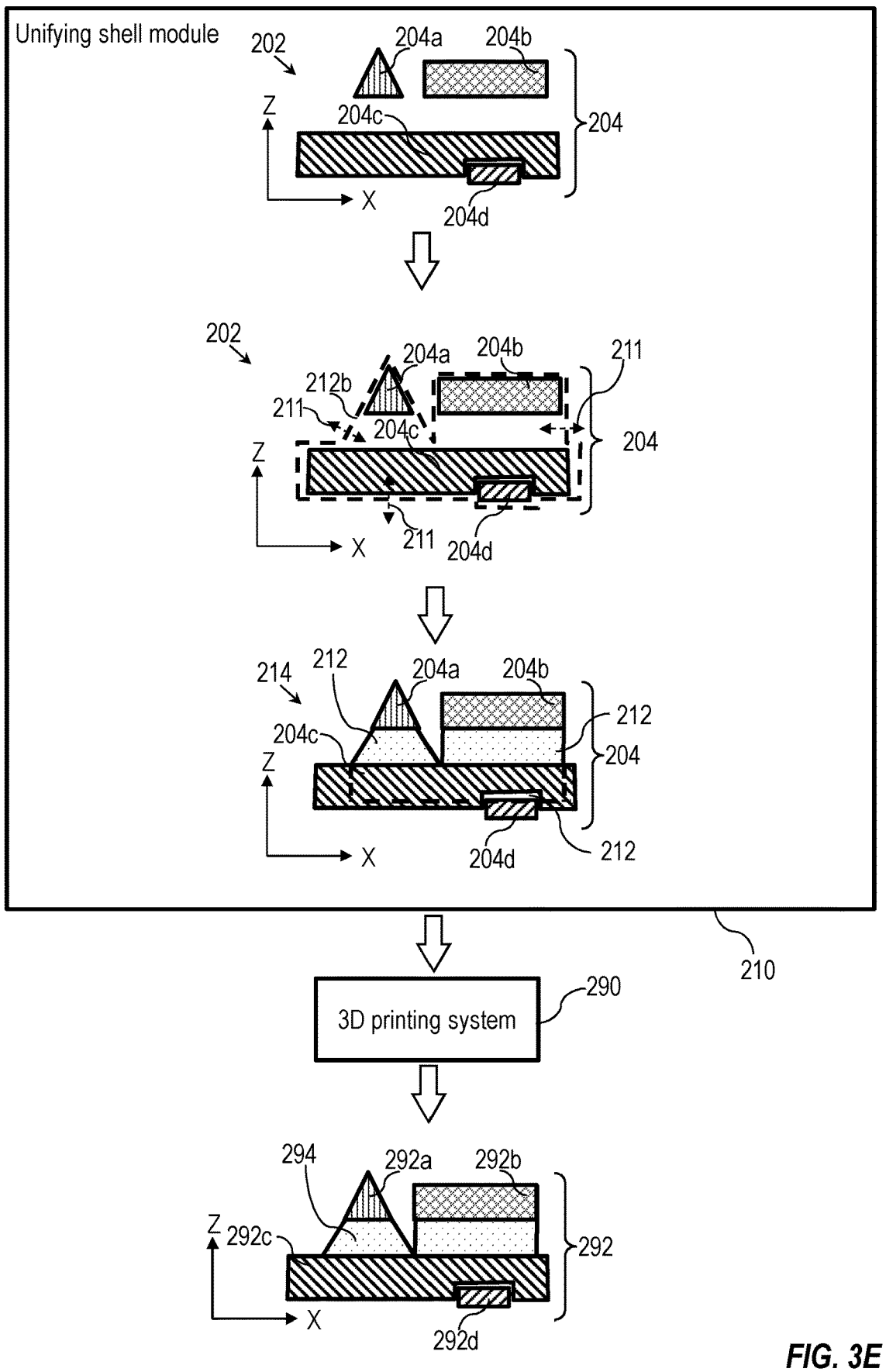
FIGS. 3E, 3F and 3G schematically depict a process of defining a polyhedron as an example of a unifying shell for a group of one or more shells, and printing thereof, according to some embodiments of the invention.
Figure 3F:
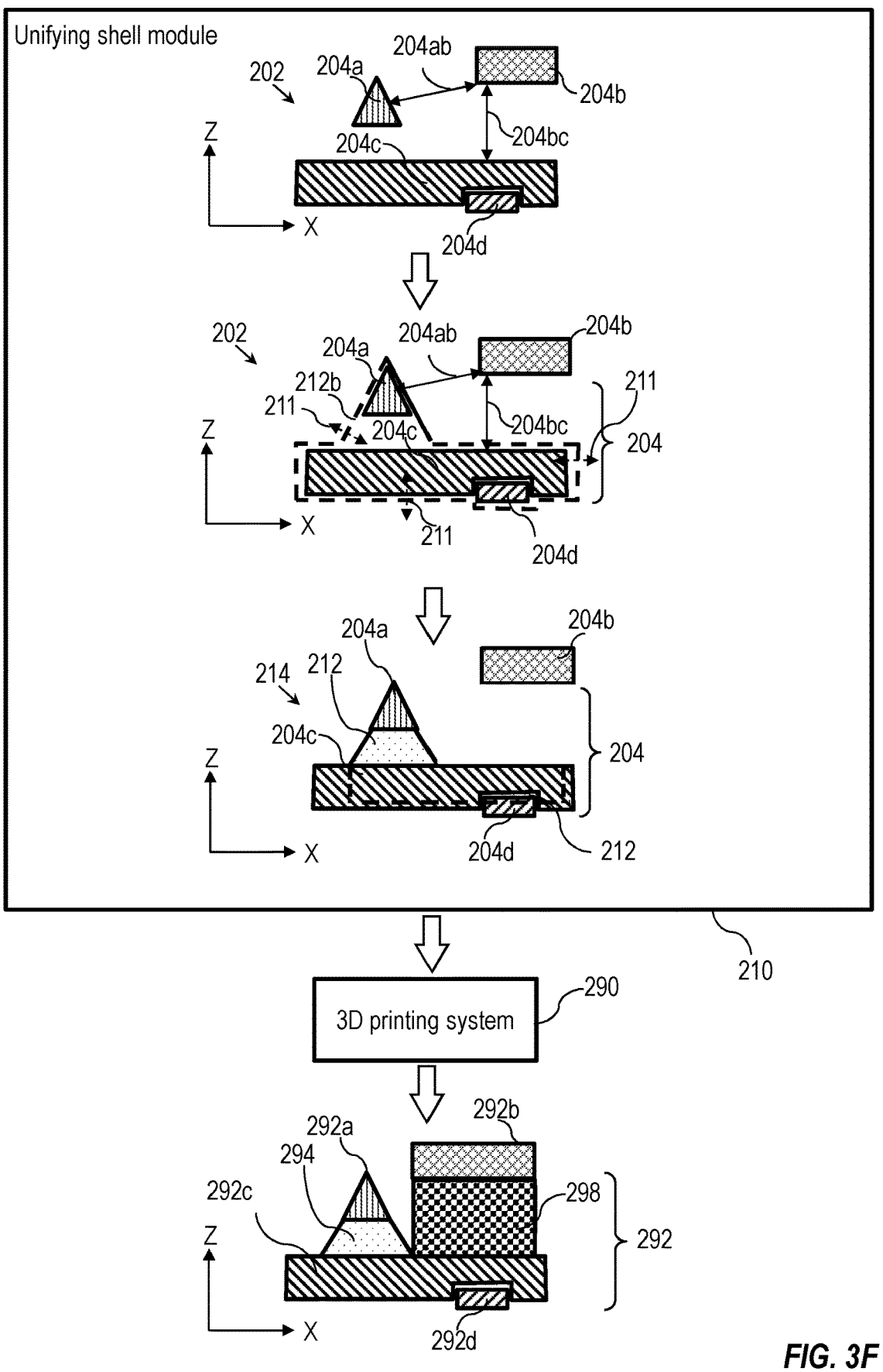
Figure 3G:
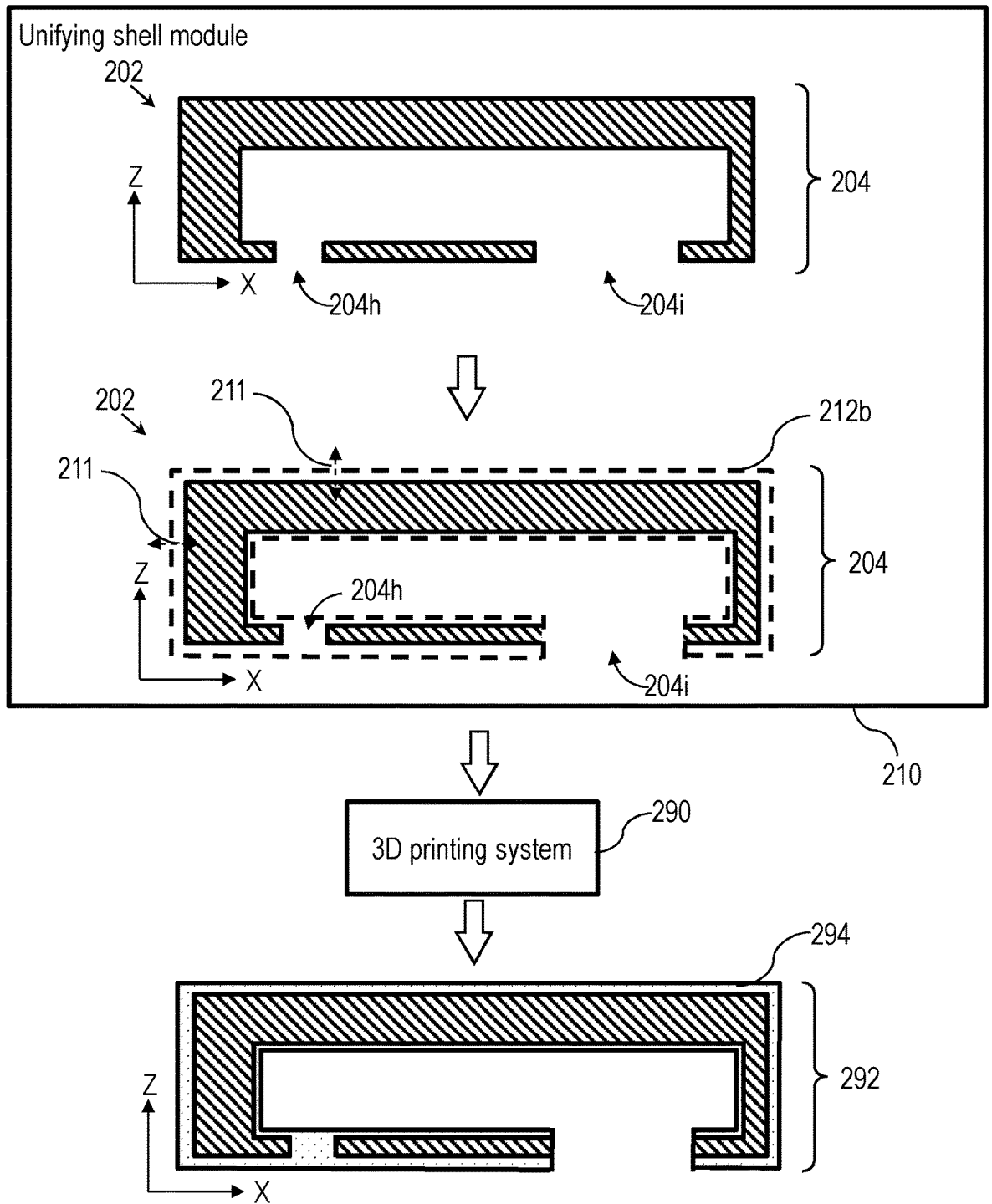

Reference is now made to FIGS. 3E, 3F and 3G, which schematically depict a process of defining a polyhedron as an example of a unifying shell 212 for a shell group 204 of one or more shells, and printing thereof, according to some embodiments of the invention. In some embodiments, unifying shell module 210 may fit a polyhedron 212b around one or more shells of shell group 204 to define unifying shell 212. For example, unifying shell module 210 may apply one or more methods, such as but not limited to "shrink wrapping" methods to define polyhedron 212b. Optionally, unifying shell module 210 may offset one or more edges, vertices, or faces of polyhedron 212b, inwardly or outwardly (e.g., as indicated by dashed arrows 211 in FIG. 3E). For example, each edge and/or face of polyhedron 212b may be offset in the same manner as other edges and/or faces, or independently of one another. In the present case, polyhedron 212b is offset inwardly and a building material is assigned to it in order to form unifying shell 212. In some embodiments, unifying shell module 210 may fit polyhedron 212b around two or more shells of shell group 204 if a distance between the two or more shells thereof is below a predetermined distance threshold. For example, distances between first shell 204a, second shell 204b, third shell 204c, fourth shell 204d of shell group 204 depicted in FIG. 3E are all below the predetermined distance threshold. In this example, unifying shell module 210 may fit polyhedron 212b around first shell 204a, second shell 204b, third shell 204c and fourth shell 204d. In some other embodiments, if the distance between one or more specific shells of shell group 204 is above the predetermined distance threshold, unifying shell module 210 may consider one or more shells as being out of the cluster and will not incorporate them into the volume of polyhedron 212b.

For example, FIG. 3F depicts a situation in which distances between first shell 204a, third shell 204c, fourth shell 204d are below the predetermined distance threshold (and thus are considered as part of shell group 204), and second shell 204b is at a distance 204ab from first shell 204a and at a distance 204bc from third shell 204c wherein distances 204ab and 204bc are above the predetermined distance threshold. In this example, unifying shell module 210 may fit polyhedron 212b to at least partly surround first shell 204a, third shell 204c and fourth shell 204d only, without including second shell 204b. In this example, slice data values that belong to a region between second shell 204b and third shell 204c may be assigned with the one or more supporting materials. Accordingly, during printing of unified object 292 based on unified 3D digital model 214, printed discrete element 292b is excluded from unified object 292 and the region between printed element 292b and printed discrete element 292c may be printed with one or more supporting materials to form a supporting structure 298. In some embodiments, unifying shell module 210 may fit polyhedron 212b around a gap in shell group 204 if the gap size is below a predetermined gap threshold.

For example, FIG. 3G depicts shell group 204 having a first gap 204h and a second gap 204i, wherein the gap size of first gap 204h is below the predetermined gap threshold and the gap size of second gap 204i is above the predetermined gap threshold. In this example, unifying shell module 210 may fit polyhedron 212b so that it includes first gap 204h but exclude second gap 204i. During printing of unified object 292 based on unified 3D digital model 214, first gap 204h may be filled with the one or more modeling materials corresponding to unified element 294.

Unifying shell 212 for shell group 204 may be defined in different cases in which the subsequently printed one or more objects of object group 292 need to be presented in their original spatial relative positions with respect to each other, and preferably have high-quality external appearance. Such cases may, for example, include a transparent enclosure (or at least partial transparent enclosure) for inner components of object group 292 (e.g., as in examples described above with respect to FIGS. 3B, 3C, 3D, 3E, 3F and 3G), a transparent section cut of object group 292 (e.g., as described below with respect to FIG. 3H), providing a transparent (or at least partly transparent) object group 292 (e.g., as described below with respect to FIGS. 3I and 3J), etc.

Figure 3H:
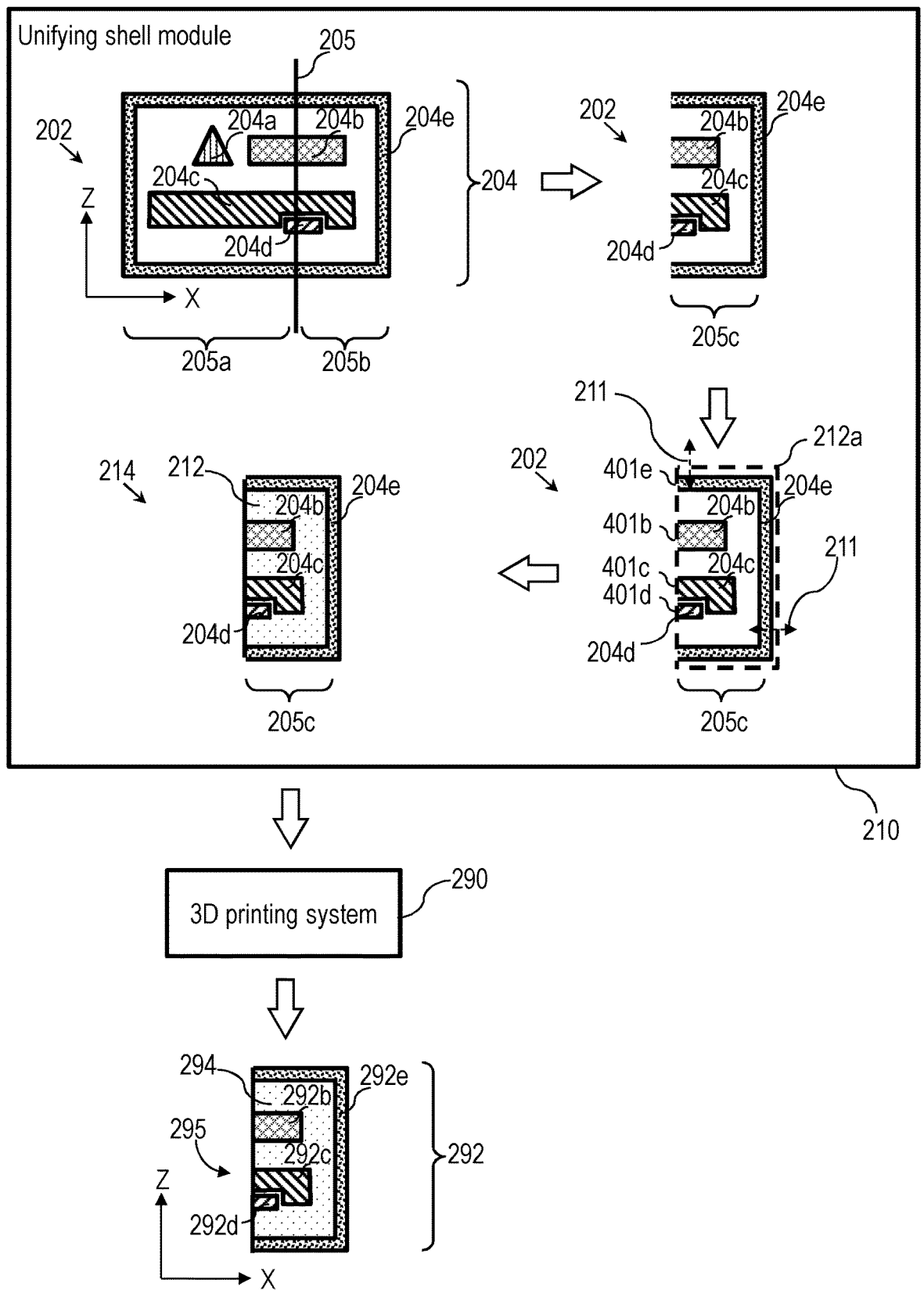
FIG. 3H schematically depicts a process of defining a unifying shell for a section cut of a group of one or more shells, and printing thereof, according to some embodiments of the invention.

Reference is now made to FIG. 3H, which schematically depicts a process of defining a unifying shell 212 for a section cut 205 of a shell group 204 of one or more shells, and printing of the same, according to some embodiments of the invention. FIG. 3H depicts shell group 204 that includes an outer shell 204e that surrounds first shell 204a, second shell 204b, third shell 204c and fourth shell 204d. In some embodiments, a user may define in digital model 202, a section cut 205 within shell group 204 thereby generating a first part 205a and a second part 205b of shell group 204. The user may then select first part 205a or second part 205b of shell group 204 to define a selected part 205c of shell group 204 (e.g., either first part 205a or the second part 205b, for example second part 205b as depicted in example of FIG. 3H). For example, the definition of section cut 205 and selection of undeleted part 205c of shell group 204 may be based on an input of the user of system 200, e.g., using user interface 230 (see FIG. 3A). In some embodiments, unifying shell module 210 may fit a bounding box 212a around one or more shells of selected part 205c to provide unified 3D digital model 214. In some other embodiments, a user may define one or more cut surfaces 401b, 401c, 401d and 401e of shells 204b, 204c, 204d and 204e respectively, so that unifying shell module 210 may identify a cut plan and fit a polyhedron 212b around one or more shells of selected part 205c to provide unified 3D digital model 214. Optionally, unifying shell module 210 may offset one or more edges, vertices, or faces of bounding box 212a or polyhedron 212b, inwardly or outwardly (e.g., as indicated by dashed arrows 211 in FIG. 3H). For example, each edge and/or face of bounding box 212a may be offset in the same manner as other edges and/or faces, or independently of one another. In the present case, bounding box 212a is offset inwardly and is used to generate a rectangular prismatic unifying shell 212. Unified 3D digital model 214 may be then sliced and printed (e.g., as described above with respect to FIGS. 3A, 3B, 3C, 3D, 3E, 3F and 3G) to provide unified object 292 with section cut 295.

Figure 3I:
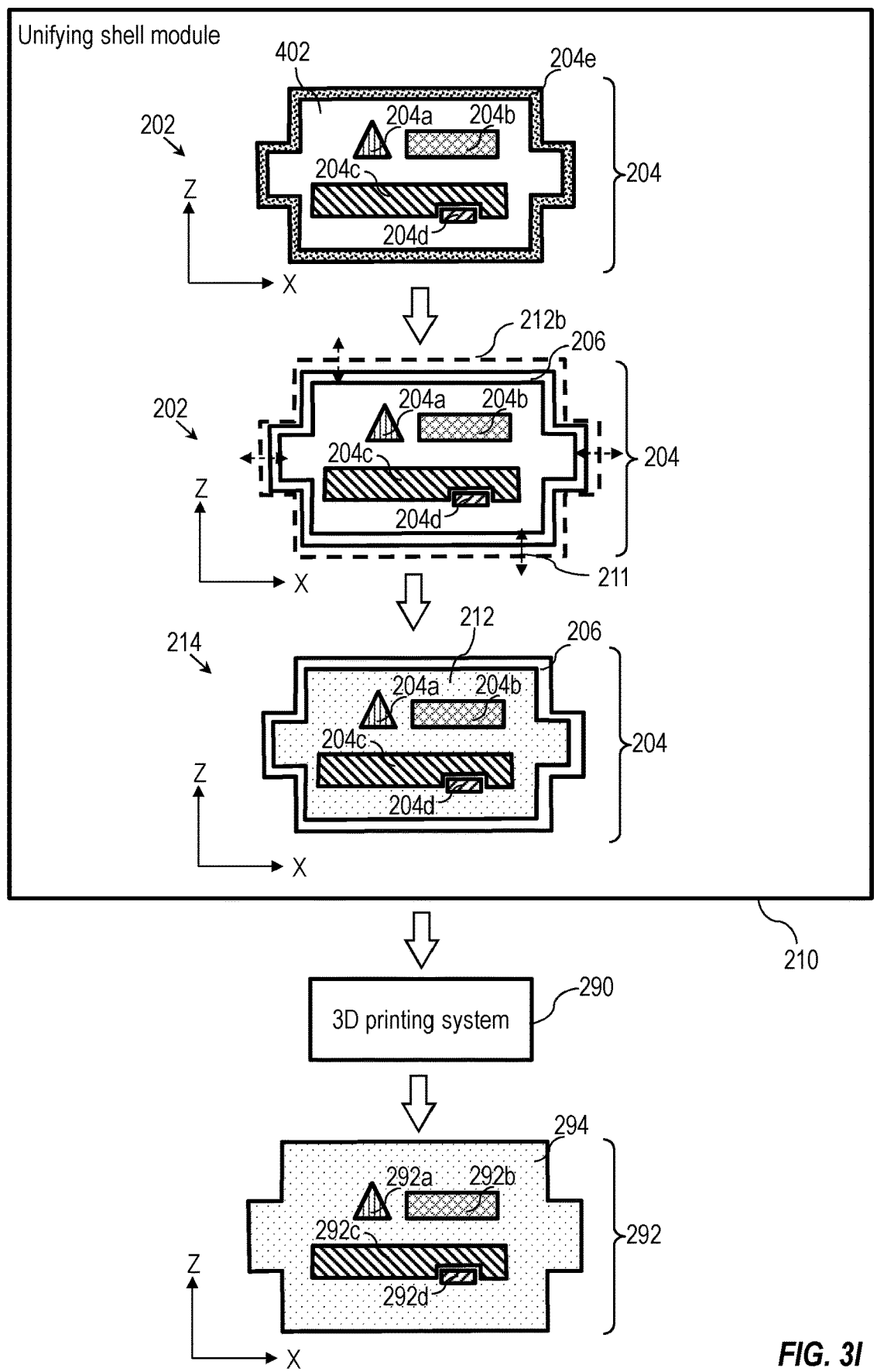
FIG. 3I schematically depicts a process of defining a transparent view of a group of one or more shells, and printing thereof, according to some embodiments of the invention.

Reference is now made to FIG. 3I, which schematically depicts a process of defining a transparent shell group 204 of one or more shells, and printing of the same, according to some embodiments of the invention. FIG. 3I depicts shells group 204 that includes outer shell 204e that surrounds first shell 204a, second shell 204b, third shell 204c and fourth shell 204d. In a typical printing, space 402 would be occupied by supporting material(s) between shells 204a-d (not shown), so that even with shell 204e being transparent, shells 204a-d would not be visible to an external observer. In some embodiments of the invention, the user may define, in digital model 202, one or more shells of shell group 204 as a transparent shell 206. For example, the definition of one or more shells as transparent shell 206 may be based on an input of the user of system 200, e.g., using user interface 230 (see FIG. 3A). In the example depicted in FIG. 3I, outer shell 204e is defined as transparent shell 206. Unifying shell module 210 may then fit a polyhedron 212b to at least partly envelope shell group 204 (e.g., including transparent shell 206). Optionally, unifying shell module 210 may offset one or more edges, vertices, or faces of polyhedron 212b, inwardly or outwardly (e.g., as indicated by dashed arrows 211 in FIG. 3I). For example, each edge and/or face of polyhedron 212b may be offset in the same manner as other edges and/or faces, or independently of one another. In the present case, polyhedron 212b is offset inwardly and is used to generate a unifying shell 212 in place of original space 402. In some embodiments, slicing and material assigning module 240 may slice unified 3D digital model 214 (e.g., as described above with respect to FIGS. 3A, 3B and 3C) and assign slice data values that belong to transparent shell 206 and unifying shell 212 with one or more transparent materials. Unified 3D digital model 214 may be further printed (e.g., as described above with respect to FIGS. 3A, 3B, 3C, 3D, 3E, 3F and 3G) to provide a transparent unified object 292, in which transparent shell 206 and unifying shell 212 are printed using one or more transparent materials. In some embodiments, attributing the same material for transparent shell 206 and unifying shell 212 may result in one apparent transparent printed discrete element 294 comprising in its volume printed discrete elements 292a-d.

Figure 3J:
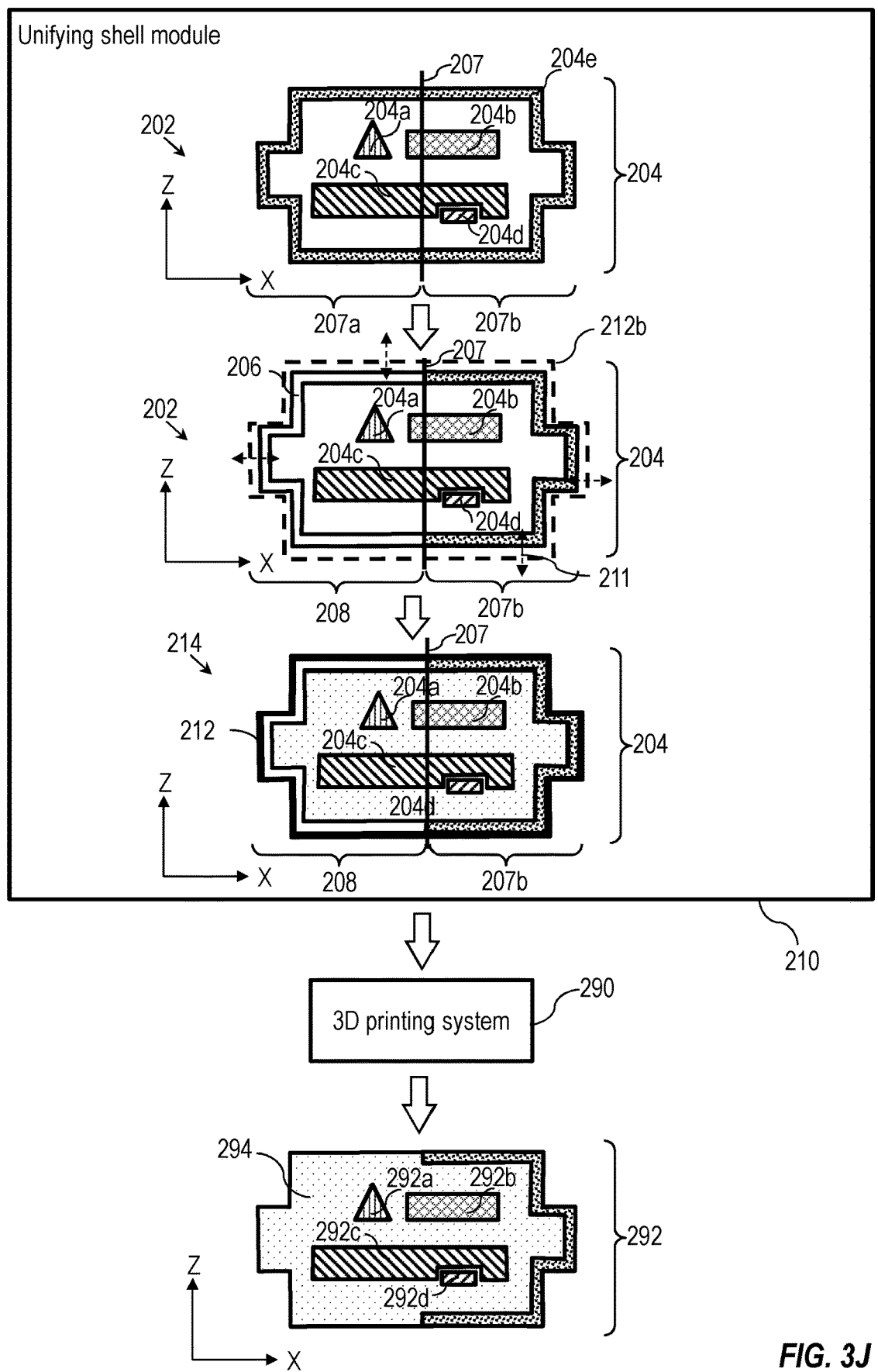
FIG. 3J schematically depicts a process of defining a partially transparent view of a group of one or more shells, and printing thereof, according to some embodiments of the invention.

Reference is now made to FIG. 3J, which schematically depicts a process of defining a partially transparent shell group 204 of one or more shells, and printing of the same, according to some embodiments of the invention. FIG. 3J depicts shell group 204 that includes outer shell 204e that surrounds first shell 204a, second shell 204b, third shell 204c and fourth shell 204d. In some embodiments, a user may define, in digital model 202, a section plane 207 of shell group 204 to provide a first part 207a and a second part 207b of shell group 204. In some embodiments, the user may select, in digital model 202, one of first part 207a and second part 207b of shell group 204 to be a transparent part 207c, and one or more shells of transparent part 207c to be transparent shell 206 (up to section plane 207). In example depicted in FIG. 3J, first part 207a and outer shell 204e are defined as transparent part 208 and transparent shell 206, respectively. Unifying shell module 210 may then fit a polyhedron 212b to at least partly envelope shell group 204 (e.g., including transparent shell 206). Optionally, unifying shell module 210 may offset one or more edges, vertices, or faces of polyhedron 212b, inwardly or outwardly (e.g., as indicated by dashed arrows 211 in FIG. 3J). For example, each edge and/or face of polyhedron 212b may be offset in the same manner as other edges and/or faces, or independently of one another. In the present case, polyhedron 212b is offset inwardly and is used to generate unifying shell 212. In some embodiments, slicing and material assigning module 240 may slice unified 3D digital model 214 (e.g., as described above with respect to FIGS. 3A, 3B and 3C) and assign slice data values that belong to transparent shell 206 and unifying shell 212 with one or more transparent materials. Unified 3D digital model 214 may be further printed (e.g., as described above with respect to FIGS. 3A, 3B, 3C, 3D, 3E, 3F and 3G) to provide a transparent unified object 292, in which transparent shell 206 and unifying shell 212 are printed using one or more transparent materials. In some embodiments, attributing the same material for transparent shell 206 and unifying shell 212 may result in one transparent unifying element 294 comprising in its volume printed discrete elements 292a-d.

Figure 3L:
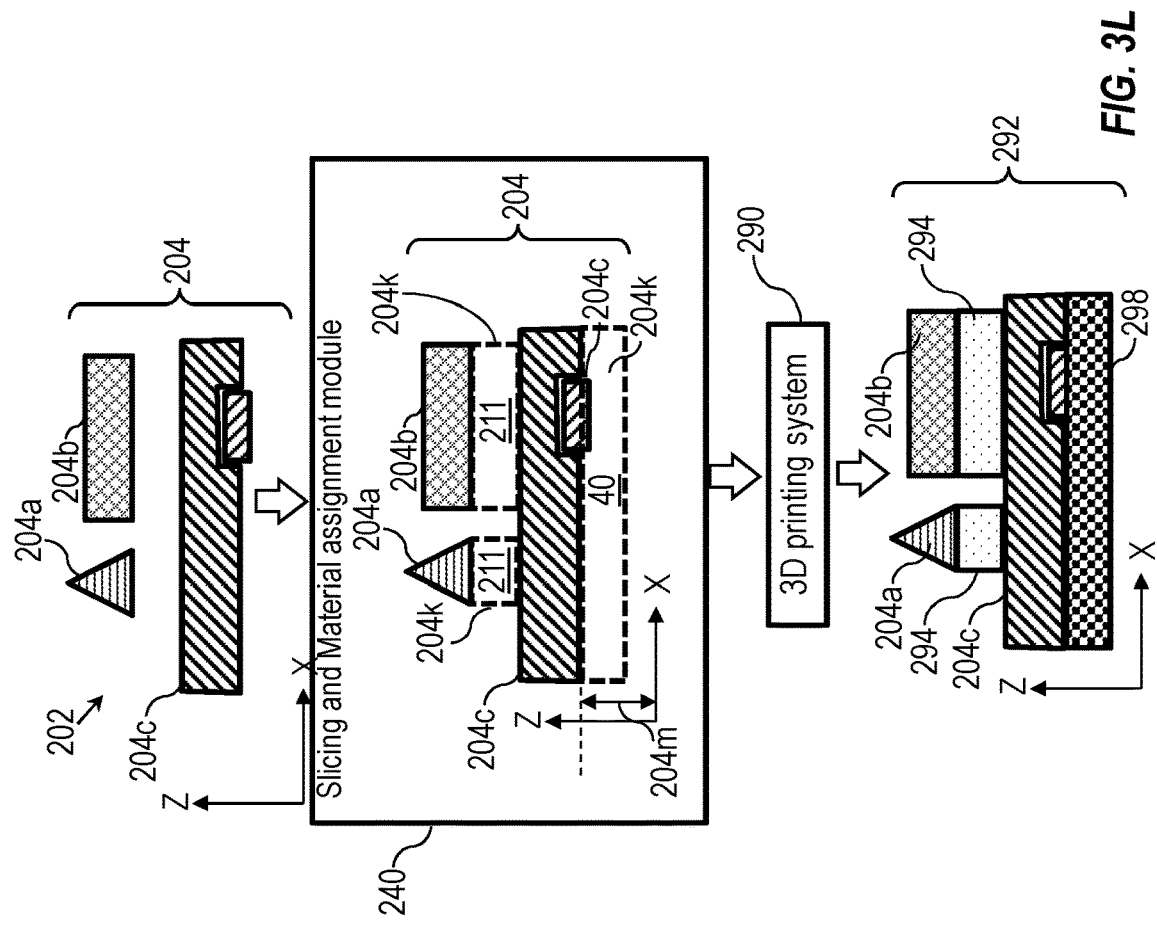
FIG. 3L schematically depicts a process of assigning slice data values that belong to one or more regions between one or more shells of a shell group with one or more additional modeling materials, and printing thereof, according to some embodiments of the invention.
Figure 3K:
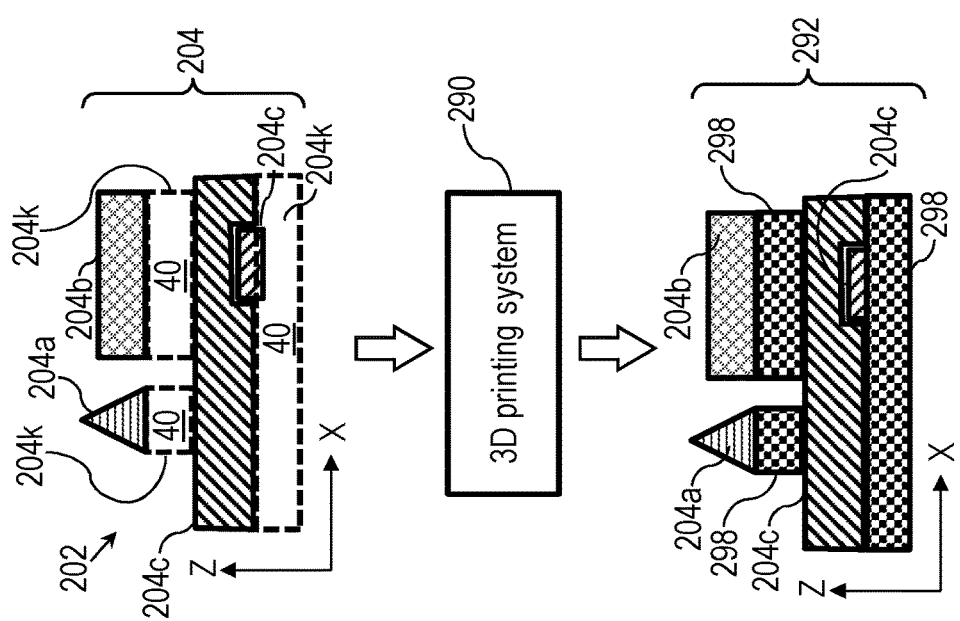
FIG. 3K schematically depicts a typical prior art process of printing a 3D object group of one or more 3D objects with one or more support structures.

Reference is now made to FIG. 3K, which schematically depicts a typical prior art process of printing a 3D object group 292 of one or more 3D objects with one or more support structures 298 between the 3D objects thereof. Reference is also made to FIG. 3L, which schematically depicts a process of assigning slice data values that belong to one or more regions between one or more shells of shell group 204 with one or more modeling materials, and printing of the same, according to some embodiments of the invention. Typically, slice data values that belong to regions 204k below shell group 204 in digital model 202 are being assigned with one or more supporting materials 40, possibly in combination with other building materials. Accordingly, during printing of object 292 based on digital model 202, regions 204k are built with supporting material(s) 40 to form one or more support structures 298 between the different elements of object 292 (e.g., as shown in FIG. 3K). In some embodiments, slicing and material assigning module 240 may automatically assign data values that belong to one or more regions 204k between two or more shells of shell group 204 that are above a specified distance 204m along one of axes of the arbitrary coordinate system XYZ with one or more unifying materials 211 and assign regions 204k that are below specified distance 204m with one or more supporting materials 40 (e.g., as shown in FIG. 3L). Specified distance 204m may be a predefined default distance or it may be defined by the user of system 200, e.g., using user interface 230. Optionally, the user may modify, change or update regions 204k to be automatically assigned with one or more unifying materials 211. For example, the user may define one or more of regions 204k in which automatic reassignment of supporting material(s) 40 with unifying material 211 will not occur. Upon printing, unified object 292 may include one or more elements printed with a support structure 298 and one or more unifying elements 294.

Figure 4:
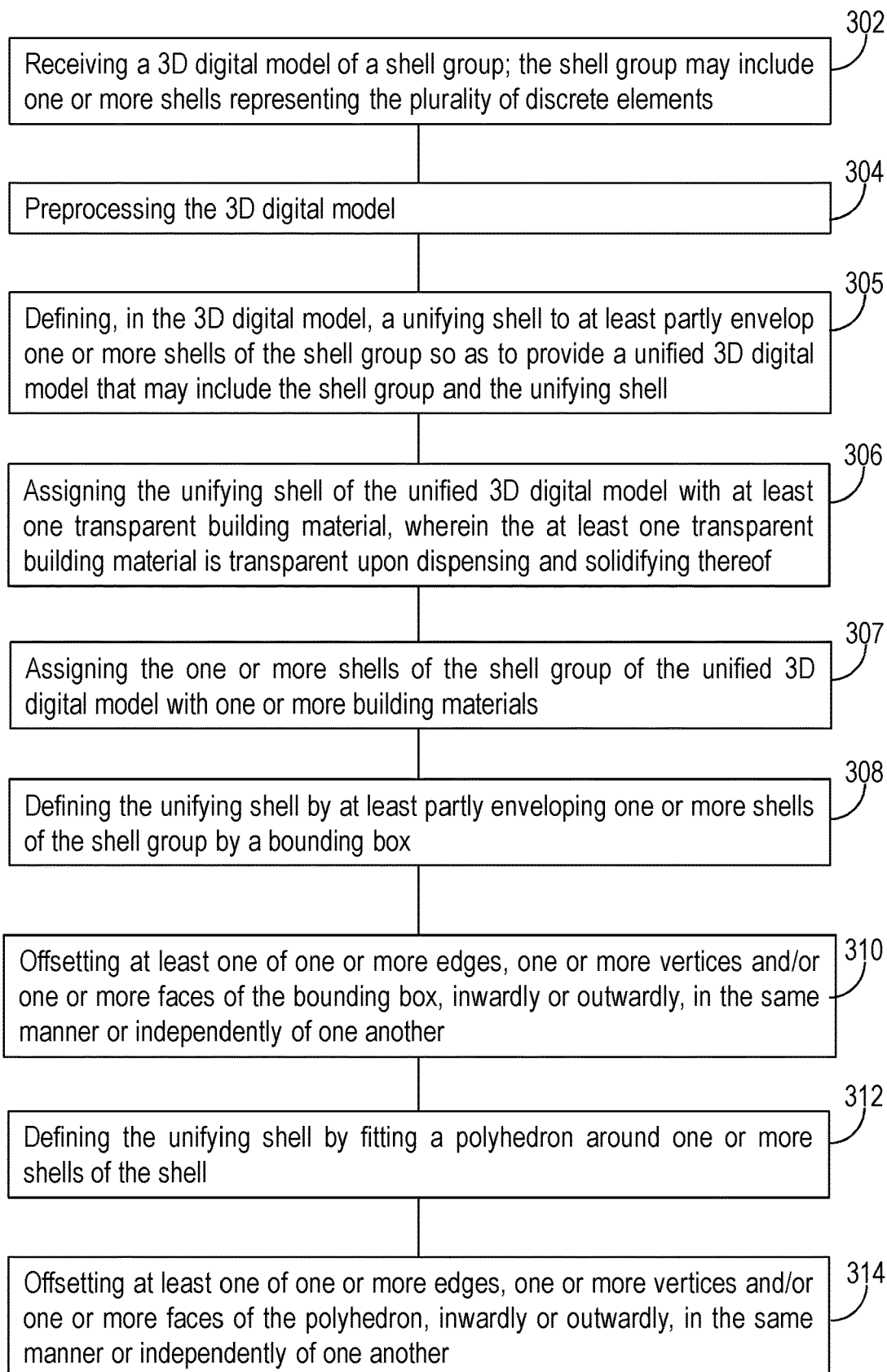
FIG. 4 is a flowchart of a method of defining a unifying shell for a group of one or more shells and printing thereof, according to some embodiments of the invention.

Reference is now made to FIG. 4, which is a flowchart of a method of defining a unifying shell for a shell group of one or more shells and printing of the same, according to some embodiments of the invention.

The method may be implemented by a system defining a unifying shell for a shell group of one or more shells and printing thereof (such as system 200 described above with respect to FIGS. 3A, 3B, 3C, 3D, 3E, 3F, 3G, 3H, 3I, 3J, 3K and 3L), which may be configured to implement the method.

It is noted that the method is not limited to the flowchart illustrated in FIG. 4 and to the corresponding description. For example, in various embodiments, the method need not move through each illustrated box or stage, or in exactly the same order as illustrated and described.

Some embodiments may include receiving a digital model of a shell group, the shell group may include one or more shells representing the plurality of discrete elements (stage 302). For example, as described above with respect to FIGS. 3A, 3B and 3C.

Some embodiments may include preprocessing the 3D digital model (stage 304). For example, as described above with respect to FIG. 3A. The preprocessing may be optional.

Some embodiments may include defining, in the 3D digital model, a unifying shell to at least partly envelop one or more shells of the shell group so as to provide a unified 3D digital model that may include the shell group and the unifying shell (stage 305). For example, as described above with respect to FIGS. 3A, 3B and 3C.

Some embodiments may include assigning the unifying shell of the unified 3D digital model with at least one transparent building material, wherein the at least one transparent building material is transparent upon dispensing and solidifying thereof (stage 306). Some embodiments may include assigning the one or more shells of the shell group of the unified 3D digital model with one or more building materials (stage 307). For example, as described above with respect to FIGS. 3A, 3B and 3C.

Some embodiments may include defining the unifying shell by at least partly enveloping one or more shells of the shell group by a bounding box (stage 308). For example, as described above with respect to FIG. 3D. Some embodiments may include offsetting at least one of one or more edges, one or more vertices and/or one or more faces of the bounding box, inwardly or outwardly, in the same manner or independently of one another (stage 310). For example, as described above with respect to FIG. 3D.

Some embodiments may include defining the unifying shell by fitting a polyhedron around one or more shells of the shell group (stage 312). For example, polyhedron 212b, as described above with respect to FIG. 3E. Some embodiments may include offsetting at least one of one or more edges, one or more vertices and/or one or more faces of the polyhedron, inwardly or outwardly, in the same manner or independently of one another (stage 314). For example, as described above with respect to FIG. 3E. Some embodiments may include fitting the polyhedron around two or more shells of the shell group if a distance between the two or more shells is below a predetermined distance threshold (stage 316). For example, as described above with respect to FIGS. 3E and 3F. Some embodiments may include fitting the polyhedron around a gap in the shell group if the gap size is below a predetermined gap size threshold (stage 318). For example, as described above with respect to FIG. 3G.

Some embodiments may include generating a set of slices of the unified 3D digital model, wherein each of the slices corresponds to a planar slice of the unified 3D digital model and may include at least one of: a first subset of slice data values that belong to the shell group, a second subset of slice data values that belong to the unifying shell and a third subset of slice data values that belong to both the shell group and the unifying shell (overlapping data values) (stage 320). For example, set 244 of slices, as described above with respect to FIGS. 3A, 3B and 3C. Some embodiments may include assigning the slice data values of the first subset with at least one of one or more building materials (stage 322). Some embodiments may include assigning the slice data values of the second subset with a transparent material (stage 323). For example, as described above with respect to FIGS. 3A, 3B and 3C. Some embodiments may include assigning the slice data values of the third subset with at least one of the one or more modeling materials and the transparent material according to an overlapping rule, for instance a priority rule (stage 324). For example, as described above with respect to FIGS. 3A, 3B and 3C. Some embodiments may include assigning at least some of the slice data values that belong to a region between two or more shells of the shell group with one or more supporting materials if the distance between the two or more shells thereof is above the predetermined distance threshold (stage 326). For example, as described above with respect to FIG. 3F.

Some embodiments may include defining, in the 3D digital model, a section cut of the shell group to provide a first part and a second part of said shell group (stage 328). For example, as described above with respect to FIG. 3H. Some embodiments may include selecting one of the first part or the second part of the shell group to provide a selected part of the shell group (stage 330). For example, as described above with respect to FIG. 3H. Some embodiments may include defining the unifying shell to at least partly envelop the selected part of the shell group (stage 332). For example, as described above with respect to FIG. 3H.

Some embodiments may include defining, in the 3D digital model, one or more shells of the shell group as a transparent shell (stage 334). For example, as described above with respect to FIG. 3I. Some embodiments may include assigning the transparent shell with the at least one transparent material (stage 335). Some embodiments may include assigning slice data values that belong to the transparent shell with the at least one transparent building material (stage 336). For example, as described above with respect to FIG. 3I.

Some embodiments may include defining, in the 3D digital model, a section plane of the shell group to provide a first part and a second part of the shell group (stage 338). For example, as described above with respect to FIG. 3J. Some embodiments may include defining one of the first part and the second part of the shell group as a transparent part and one or more shells of the shell group as a transparent shell up to the section plane (stage 340). For example, as described above with respect to FIG. 3J. Some embodiments may include assigning the transparent shell in the transparent part with the at least one transparent building material (stage 341). Some embodiments may include assigning slice data values that belong to the transparent shell in the transparent part with the at least one transparent building material (stage 342). For example, as described above with respect to FIG. 3J.

Some embodiments may include assigning one or more regions between two or more shells of the shell group with the at least one transparent building material if the one or more regions are above a specified distance along one of the axes of an arbitrary coordinate system in the 3D digital model (stage 343). Some embodiments may include assigning data values that belong to one or more regions between two or more shells of the shell group with the at least one transparent building material if the one or more regions are above a specified distance along one of the axes of an arbitrary coordinate system in the 3D digital model (stage 344). For example, as described above with respect to FIG. 3L.

Some embodiments may include assigning one or more regions between two or more shells of the shell group with one or more supporting materials if the one or more regions are below the specified distance along one of the axes of the arbitrary coordinate system in the 3D digital model (stage 345). Some embodiments may include assigning data values that belong to one or more regions between two or more shells of the shell group with one or more supporting materials if the one or more regions are below the specified distance along one of the axes of the arbitrary coordinate system in the 3D digital model (stage 346). For example, as described above with respect to FIG. 3L.

Some embodiments may include dispensing, in layers, the at least one transparent building material and the one or more building materials according to the unified 3D digital model to form a 3D object comprising one or more discrete elements that are at least partly connected by a unifying element (stage 348). Some embodiments may include dispensing, in layers, one or more building materials, according to the set of slices of the unified 3D digital model and the materials assigned therewith, to form a unified object comprising one or more printed discrete elements that are at least partly enveloped/connected by a unifying element (stage 348). Some embodiments may include dispensing, in layers, the at least one transparent building material and the one or more building materials, according to the set of slices of the unified 3D digital model and the materials assigned therewith to form the 3D object comprising the one or more printed discrete elements that are at least partly enveloped/connected by the unifying element (stage 350). For example, as described above with respect to FIGS. 3A, 3B and 3C.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of printing a 3D object comprising a plurality of discrete elements, the method comprising:
   receiving a 3D digital model of a shell group comprising one or more shells representing the plurality of discrete elements;
   defining, in the 3D digital model, a unifying shell to at least partly envelop one or more shells of the shell group so as to provide a unified 3D digital model comprising the shell group and the unifying shell;
   assigning the unifying shell of the unified 3D digital model with at least one transparent building material, wherein the at least one transparent building material is transparent upon dispensing and solidifying thereof;
   assigning the one or more shells of the shell group of the unified 3D digital model with one or more building materials;
   generating a set of slices of the unified 3D digital model, wherein each of the slices corresponds to a planar slice of the unified 3D digital model and comprises at least one of
   a first subset of slice data values that belong to the shell group,
   a second subset of slice data values that belong to the unifying shell, and
   a third subset of slice data values that belong to both the shell group and the unifying shell;
   assigning the slice data values of the first subset with at least one of the one or more building materials;
   assigning the slice data values of the second subset with the at least one transparent building material;
   assigning the slice data values of the third subset with at least one of the one or more building materials and the at least one transparent building material according to an overlapping rule;
   assigning at least some of the slice data values that belong to a region between two or more shells of the shell group with one or more supporting materials when the distance between the two or more shells thereof is above a predetermined distance threshold; and
   dispensing, in layers, the at least one transparent building material and the one or more building materials, according to the unified 3D digital model and according to the set of slices of the unified 3D digital model and the materials assigned therewith to form the 3D object comprising the one or more discrete elements that are at least partly connected by a unifying element.

2. The method of claim 1, further comprising defining the unifying shell by at least partly enveloping one or more shells of the shell group by a bounding box.

3. The method of claim 1, further comprising:
defining, in the 3D digital model, one or more shells of the shell group as a transparent shell; and
assigning the transparent shell with the at least one transparent building material.

4. The method of claim 1, further comprising:
defining, in the 3D digital model, a section cut of the shell group to provide a first part and a second part of the shell group;
selecting one of the first part or the second part of the shell group to provide a selected part of the shell group; and
defining the unifying shell to at least partly envelop the selected part of the shell group.

5. The method of claim 1, further comprising:
defining, in the 3D digital model, a section plane of the shell group to provide a first part and a second part of the shell group;
defining one of the first part and the second part of the shell group as a transparent part and one or more shells of the shell group as a transparent shell up to the section plane; and
assigning the transparent shell in the transparent part with the at least one transparent building material.

6. The method of claim 1, further comprising assigning one or more regions between two or more shells of the shell group with the at least one transparent building material if the one or more regions are above a specified distance along one of the axes of an arbitrary coordinate system in the 3D digital model.

7. The method of claim 6, further comprising assigning one or more regions between two or more shells of the shell group with one or more supporting materials if the one or more regions are below the specified distance along one of the axes of the arbitrary coordinate system in the 3D digital model.

8. The method of claim 1, wherein the overlapping rule is a priority rule which determines a priority order between the data values of the shell group and the data values of the unifying shell.

9. A system for printing a 3D object comprising a plurality of discrete elements, the system comprising:
a processing unit configured to:
receive a 3D digital model of a shell group comprising one or more shells representing the plurality of discrete elements;
define, in the 3D digital model, a unifying shell to at least partly envelop one or more shells of the shell group so as to provide a unified 3D digital model comprising the shell group and the unifying shell;
assign the unifying shell of the unified 3D digital model with at least one transparent building material, wherein the at least one transparent building material is transparent upon dispensing and solidifying thereof;
assign the one or more shells of the shell group of the unified 3D digital model with one or more building materials;
generate a set of slices of the unified 3D digital model, wherein each of the slices corresponds to a planar slice of the unified 3D digital model and comprises at least one of:
a first subset of slice data values that belong to the shell group,
a second subset of slice data values that belong to the unifying shell, and
a third subset of slice data values that belong to both the shell group and the unifying shell;
assign the slice data values of the first subset with at least one of the one or more building materials;
assign the slice data values of the second subset with the at least one transparent building material;
assign the slice data values of the third subset with at least one of the one or more building materials and the at least one transparent building material according to an overlapping rule; and
wherein the processing unit is further configured to assign at least some of the slice data values that belong to a region between two or more shells of the shell group with one or more supporting materials when the distance between the two or more shells thereof is above a predetermined distance threshold; and
a 3D printing device configured to dispense, in layers, the at least one transparent building material and the one or more building materials according to the unified 3D digital model and according to the set of slices of the unified 3D digital model to form the 3D object comprising one or more discrete elements that are at least partly enveloped by a unifying element.

10. The system of claim 9, wherein the processing unit is further configured to define the unifying shell by at least partly enveloping one or more shells of the shell group by a bounding box.

11. The system of claim 9, wherein the processing unit is further configured to:
define, in the 3D digital model, one or more shells of the shell group as a transparent shell; and
assign the transparent shell with at least one of the at least one transparent building material.

12. The system of claim 9, wherein the processing unit is further configured to:
define, in the 3D digital model, a section cut of the shell group to provide a first part and a second part of the shell group;
select one of the first part or the second part of the shell group to provide a selected part of the shell group; and
define the unifying shell to at least partly envelop the selected part of the shell group.

13. The system of claim 9, wherein the processing unit is further configured to:
define, in the 3D digital model, a section plane of the shell group to provide a first part and a second part of the shell group;
define, in the 3D digital model, one of the first part and the second part of the shell group as a transparent part and one or more shells of the shell group as a transparent shell up to the section plane; and
assign the transparent shell in the transparent part with the at least one transparent building material.

14. The system of claim 9, wherein the processing unit is further configured to assign one or more regions between two or more shells of the shell group with the at least one transparent building material if the one or more regions are above a specified distance along one of the axes of an arbitrary coordinate system in the 3D digital model.

15. The system of claim 14, wherein the processing unit is further configured to assign one or more regions between two or more shells of the shell group with one or more supporting materials if the one or more regions are below the specified distance along one of the axes of the arbitrary coordinate system in the 3D digital model.

16. The system of claim 9, wherein the overlapping rule is a priority rule which determines a priority order between the data values of the shell group and the data values of the unifying shell.

\* \* \* \* \*